(12) United States Patent
Liu et al.

(10) Patent No.: US 11,102,314 B2
(45) Date of Patent: Aug. 24, 2021

(54) SYSTEMS AND METHODS FOR PROVIDING A SOCIAL MEDIA KNOWLEDGE BASE

(71) Applicant: Thomson Reuters Enterprise Centre GmbH, Zug (CH)

(72) Inventors: Xiaomo Liu, Forest Hills, NY (US); Sameena Shah, White Plains, NY (US); Xin Shuai, Inver Grove Heights, MN (US); Armineh Nourbakhsh, Brooklyn, NY (US)

(73) Assignee: THOMSON REUTERS ENTERPRISE CENTRE GMBH, Zug (CH)

( * ) Notice: Subject to any disclaimer, the term of this patent is extended or adjusted under 35 U.S.C. 154(b) by 588 days.

(21) Appl. No.: 15/712,952

(22) Filed: Sep. 22, 2017

(65) Prior Publication Data

US 2018/0091611 A1    Mar. 29, 2018

Related U.S. Application Data

(60) Provisional application No. 62/401,279, filed on Sep. 29, 2016.

(51) Int. Cl.
*G06Q 10/10* (2012.01)
*G06Q 10/06* (2012.01)
(Continued)

(52) U.S. Cl.
CPC ............ *H04L 67/22* (2013.01); *G06K 9/6263* (2013.01); *G06N 5/022* (2013.01); *G06N 20/00* (2019.01);
(Continued)

(58) Field of Classification Search
CPC ...... G06Q 50/01; G06K 9/6263; G06N 20/00; G06N 5/022; H04L 67/22; H04L 67/025; H04L 67/306; H04W 4/21
(Continued)

(56) References Cited

U.S. PATENT DOCUMENTS 9,288,123 B1 * 3/2016 Safford .................. G06Q 50/01
9,418,391 B2 * 8/2016 Doddavula ......... G06F 16/9535
(Continued)

OTHER PUBLICATIONS

International Search Report and Written Opinion dated Nov. 27, 2017, of the corresponding International Application PCT/US2017/052998 filed Sep. 22, 2017, 11 pages.
(Continued)

*Primary Examiner* — Jonathan P Ouellette
(74) *Attorney, Agent, or Firm* — Norton Rose Fulbright US LLP

(57) ABSTRACT

A method of identifying and presenting accounts and postings of a social media system may include: retrieving, via at least one communication interface of the social media system, account information for a plurality of social media accounts; classifying, based on the retrieved account information, the plurality of social media accounts according to account type; ranking, based on the retrieved account information, the plurality of social media accounts according to perceived importance or influence; storing, in an account database, a representation of a subset of the plurality of social media accounts having a ranking greater than a predetermined threshold; retrieving, via the at least one API, postings of the stored social media accounts; and generating, for display on a user system, a user interface to present the retrieved social media postings for the stored accounts organized according to at least one of: account type, or ranking.

33 Claims, 15 Drawing Sheets

(51) Int. Cl.

| | |
|---|---|
| *G06Q 30/02* | (2012.01) |
| *H04L 29/08* | (2006.01) |
| *G06K 9/62* | (2006.01) |
| *G06Q 50/00* | (2012.01) |
| *G06N 20/00* | (2019.01) |
| *G06N 5/02* | (2006.01) |
| *H04W 4/21* | (2018.01) |

(52) U.S. Cl.
CPC ........... *G06Q 50/01* (2013.01); *H04L 67/025* (2013.01); *H04L 67/306* (2013.01); *H04W 4/21* (2018.02)

(58) Field of Classification Search
USPC .......................................... 705/1.1–912, 319
See application file for complete search history.

(56) References Cited

U.S. PATENT DOCUMENTS

| | | | |
|---|---|---|---|
| 9,953,063 | B2* | 4/2018 | Spasojevic ........ G06F 16/24578 |
| 2010/0121843 | A1 | 5/2010 | Goeldi |
| 2011/0282943 | A1 | 11/2011 | Anderson et al. |
| 2012/0059901 | A1 | 3/2012 | Tsai |
| 2012/0079020 | A1 | 3/2012 | Park et al. |
| 2013/0103667 | A1* | 4/2013 | Minh ....................... H04L 51/32 707/709 |
| 2013/0124653 | A1* | 5/2013 | Vick ........................ H04L 51/32 709/206 |
| 2013/0218862 | A1* | 8/2013 | Ghosh ................... G06F 16/248 707/706 |
| 2013/0290208 | A1 | 10/2013 | Bonmassar et al. |
| 2013/0297581 | A1* | 11/2013 | Ghosh ................... G06F 16/337 707/706 |
| 2013/0297694 | A1 | 11/2013 | Ghosh |
| 2013/0298038 | A1* | 11/2013 | Spivack ................ G06F 3/0484 715/753 |
| 2013/0304726 | A1 | 11/2013 | Sandulescu et al. |
| 2013/0339180 | A1* | 12/2013 | LaPierre ............ G06Q 30/0631 705/26.7 |
| 2014/0040387 | A1* | 2/2014 | Spivack ............ G06F 16/24578 709/206 |
| 2014/0156673 | A1* | 6/2014 | Mehta ................... H04L 67/025 707/748 |
| 2014/0201227 | A1 | 7/2014 | Hamilton-Dick et al. |
| 2014/0236927 | A1* | 8/2014 | Catledge ............. G06F 16/2457 707/722 |
| 2014/0337257 | A1 | 11/2014 | Chatterjee et al. |
| 2014/0365240 | A1* | 12/2014 | Canton .................. G06Q 50/22 705/3 |
| 2015/0095108 | A1* | 4/2015 | Savelli .................... H04L 67/22 705/7.29 |
| 2015/0120502 | A1 | 4/2015 | Jung et al. |
| 2015/0213022 | A1* | 7/2015 | Agarwal ........... G06F 16/24578 707/731 |
| 2015/0350149 | A1* | 12/2015 | Acharya ................. H04L 51/32 709/206 |
| 2016/0019301 | A1 | 1/2016 | Goldenstein et al. |
| 2016/0071162 | A1* | 3/2016 | Ogawa ............... G06Q 30/0269 705/14.66 |
| 2016/0078279 | A1* | 3/2016 | Pitre ........................ G06T 7/11 382/118 |
| 2016/0148077 | A1* | 5/2016 | Cox ..................... G06K 9/6263 382/159 |
| 2016/0203498 | A1 | 7/2016 | Das et al. |
| 2016/0328482 | A1 | 11/2016 | Shah et al. |
| 2017/0103402 | A1* | 4/2017 | El-Diraby .......... G06Q 30/0201 |
| 2018/0089193 | A1* | 3/2018 | Knight .................. G06Q 50/01 |

OTHER PUBLICATIONS

Castillo et al., "Information Credibility on Twitter". WWW 2011, Mar. 28-Apr. 1, 2011, Hyderabad, India, ACM 978-1-4503-0632-Apr. 11, 2003, pp. 675 to 684.
Gupta et al., "Faking Sandy: Characterizing and Identifying Fake Images on Twitter during Hurricane Sandy", WWW 2013 Companion, May 13-17, 2013, Rio de Janeiro, Brazil, ACM 978-1-4503-2038-Feb. 13, 2005.
Boididou et al., "Challenges of Computational Verification in Social Multimedia", WWW14 Companion, Apr. 7-11, O2014, Seoul, Korea, ACM 978-1-4503-2745-Sep. 14, 2004, http:l/dx.doi.org/10.1145/2567948.2579323, pp. 743 to 748.
Finn et al., "Investigating Rumor Propagation with TwitterTrails", http://cs.wellesiey,edu/~pmetaxas!TwitterTmilsinvestigating- rumor-propagation.pdf, 10 pages.
Leskovec et al., "Meme-tracking and the Dynamics of the News Cycle", KDD '09 Paris, France, 9 pages.
Ratkiewicz et al., "Detecting and Tracking Political Abuse in Social Media", Proceedings of the Fifth International AAAI Conference on Weblogs and Social Media, pp. 297 to 304.
Ennals et al., "Highlighting Disputed Claims on the Web", WWW 2010, Apr. 26-30, 2010, Raleigh, North Carolina, USA, ACM 978-1-60558-799-Aug. 10, 2004, 10 pages.
Osborne et al., "Real-Time Detection, Tracking, and Monitoring of Automatically Discovered Events in Social Media", Proceedings of 52nd Annual Meeting of the Association for Computational Linguistics: System Demonstrations, Baltimore, Maryland USA, Jun. 23-24, 2014, pp. 37-42.
Preotiuc-Pietro et al., "A temporal model of text periodicities using Gaussian Processes", Proceedings of the 2013 Conference on Empirical Methods in Natural Language Processing, Seattle, Washington, USA, Oct. 18-21, 2013, pp. 977-988.
Friggeri et al., "Rumor Cascades", Proceedings of the Eighth International AAAI Conference on Weblogs and Social Media, pp. 101-110.
Mendoza et al., "Twitter Under Crisis: Can we trust what we RT?", 1st Workshop on Social Media Analytics (SOMA '10), Jul. 25, 2010, Washington, DC, USA, 9 pages.
Petrovic et al., "Streaming First Story Detection with application to Twitter", http://homepages.inf.ed.ac.uk/miles/papers/naacl10a.pdf, 9 pages.
Qazvinian et al., "Rumor has it: Identifying Misinformation in Microblogs", Proceedings of the 2011 Conference on Empirical Methods in Natural language Processing, Edinburgh, Scotland, UK, Jul. 27-31, 2011, pp. 1589-1599.
Wu et al., "False Rumors Detection on Sina Weibo by Propagation Structures", http://www.cs.sjtu.edu.cn/-kzhu/papers/kzhu-rumor.pdf, 12 pages.
Yang et al., "Automatic Detection of Rumor on Sina Weibo", MDS'12 Aug. 12, 2012, Beijing,China, 7 pages.
Sun et al., "Detecting Event Rumors on Sina Weibo Automatically", APWeb 2013, LNCS 7808, 2013, pp. 120-131.

* cited by examiner

SYSTEMS AND METHODS FOR PROVIDING A SOCIAL MEDIA KNOWLEDGE BASE

CROSS REFERENCE TO RELATED APPLICATIONS

This application claims priority to U.S. Provisional Patent Application No. 62/401,279, filed on Sep. 29, 2016, which is hereby incorporated by reference herein in its entirety. This application is also related to U.S. Non-Provisional patent application Ser. No. 15/143,730, filed on May 2, 2016, which is also hereby incorporated by reference herein in its entirety.

BACKGROUND INFORMATION

Social media has become a prominent source of spreading and consuming information. It often provides news even faster than traditional news outlets. For example, when a shooting a happened in San Bernardino at 1:59 pm EST on Dec. 2 2015, the fire department of San Bernardino responded immediately and notified the public through Twitter® at 2:14 pm. That appears to be the first public information about the shooting, earlier than any news media. After 5 minutes, a local news channel picked it up and produced the first news media reporting about this tragedy. It was then broadcasted to country-wide and even worldwide by two national news organizations at 2:28 pm and 2:32 pm, respectively.

An existing event detection capability detected this unfortunate event at 2:24 pm. However, this may still be too slow, as although it was able to beat mainstream news, it still fell behind the local news media and had 10 minutes delay compared to the original Tweet.

In another example, one morning a portfolio manager, who has mainly invested in the technology sector, started his daily research at his office. Besides the formal news channels, he might also be interested in viewing opinions of experts on a particular company or product. For instance, since a company just released a list of car models supporting its product in earlier January, he would like to look for experts' market projections in social media that day.

Another problem, however, is that many social media data streams are large. For example, Twitter® provides a total of 700 million tweets per day. It is extremely difficult to find out useful information for topics such as news and business by merely monitoring this data stream, since a majority of the data stream is noise such as spam, advertisements and chit-chat.

Thus, a need exists for systems and method that can shorten event detection latency, such as into a few seconds, so that emergent news can be delivered earlier. A need also exists for systems and methods to pierce the volume and noise of social media to effectively and efficiently deliver event detection and opinions to users.

BRIEF DESCRIPTION OF THE DRAWINGS

So that the features of the present invention can be understood, a number of drawings are described below. However, the appended drawings illustrate only particular embodiments of the invention and are therefore not to be considered limiting of its scope, for the invention may encompass other equally effective embodiments.

DETAILED DESCRIPTION OF EXAMPLE EMBODIMENTS

System and methods for identifying, collecting and presenting accounts and postings of a social media system may: retrieve, via at least one communication interface of the social media system, account information for a plurality of social media accounts; classify, based on the retrieved account information, the plurality of social media accounts according to account type; rank, based on the retrieved account information, the plurality of social media accounts according to perceived importance or influence; store, in an account database, a representation of a subset of the plurality of social media accounts having a ranking greater than a predetermined threshold; retrieve, via the at least one communication interface of the social media system, postings of the stored social media accounts; and generate, for display on a user system, a user interface to present the retrieved social media postings for the stored accounts according to at least one of account type or ranking.

Figure 1:
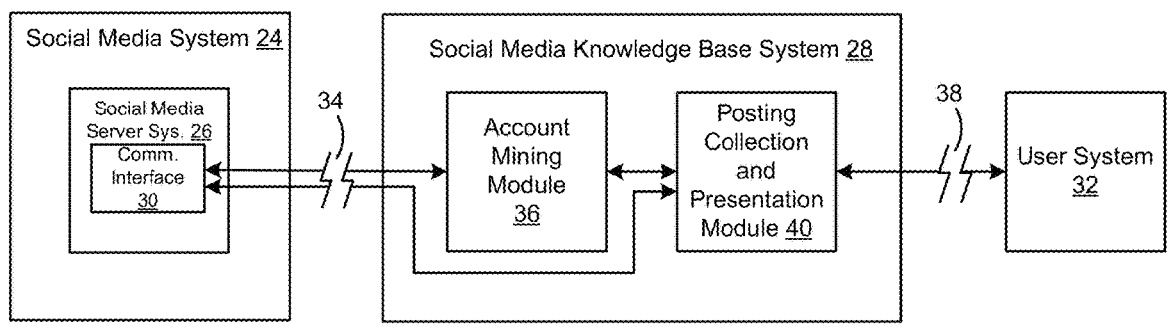
FIG. 1 is a schematic diagram depicting an embodiment of a system for providing identification, collection and presentation of important and influential social media sources.

FIG. 1 depicts an embodiment of a system 20 for providing improved identification, collection and presentation of important and influential social media sources. The system 20 includes a social media system 24, a social media knowledge base system 28, and a user system 32.

The social media system 24 provides a platform for its users to post messages and/or content to a network of other users using accounts of the system 24. The social media system 24 includes a social media server system 26 having a communication interface 30. The social media server system 26 provides functionality of the social media system 24 for users and as discussed herein, with the communication interface 30 providing communications over one or more communication networks 34 between the social media system 24 and other systems. In embodiments, the social media system 24 can take various different forms. In one example, the social media system 24 can be Twitter®, in which users use their accounts to, among other things, post short messages and/or content, called Tweets®, on the system. In other embodiments, the social media system 24 can be another system, such as one or more of Facebook®, Instagram®, Snapchat®, Tumblr®, Pinterest®, Flickr®, or Reddit®, etc.

The knowledge base system 28 includes an account mining module 36 and a posting collection and presentation module 40. The account mining module 36 interfaces with the social media system 24 to identify, classify, rank and store important and influential accounts in the social media system 24. The posting collection and presentation module 40 interfaces with the social media system 24 to collect postings of the important and influential accounts identified etc. by the account mining module 36, and with the user system 32 to present the accounts and postings via a user interface for effective and efficient digestion by the user.

The user system 32 may be any computing platform, such as one more or more a computer, a desktop computer, a laptop computer, a tablet, a smart phone, or other stationary or mobile devices, etc., that a user uses to communicate with the social media knowledge base system 28 via one or more communication networks 38.

In embodiments, the system 20 for providing improved identification, collection and presentation of important and influential social media sources may include only any subset of, or an alternative connection of, the features depicted in or discussed herein in regard to FIG. 1.

Figure 2:
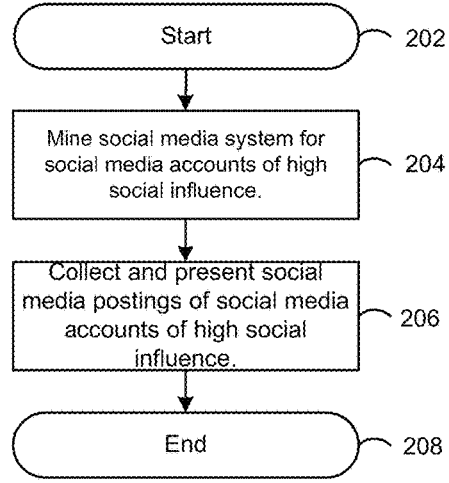
FIG. 2 is a flowchart depicting an embodiment of a method of identifying, collecting and presenting important and influential social media sources.

FIG. 2 depicts an embodiment of a method 200 of providing improved identification, collection and presentation of important and influential social media sources. The method may be performed by or involving components of the system 20 of FIG. 1, such as by the social media knowledge base system 28. The method begins at step 202.

At step 204, the social media system 24 is mined for social media accounts of high importance or influence. To mine the social media system 24 for accounts of high importance or influence, the account mining module 36 of the knowledge base system 28 performs one or more of account intake, classification, ranking and storage functionalities, as discussed herein. For example, the mining may include any combination of the features of the systems and methods of FIGS. 3-21 and 26, or any combination of any subset and/or alternative ordering of the features of such system or methods.

At step 206, social media postings of the mined accounts are collected, and the accounts and postings are presented for efficient and effective digestion by a user. To collect the social media postings for the mined accounts, the posting collection and presentation module 40 performs one or more of posting intake, indexing, and presentation functionalities, as discussed herein. For example, the collection and presentation may include any combination of the features of the systems and methods of FIGS. 23-25, or any combination of any subset and/or alternative ordering of the features of such system or methods. The method ends at step 206.

In embodiments, a method of providing improved identification, collection and presentation of important and influential social media sources may include only any subset of, or an alternative ordering of, the features depicted in or discussed above in regard to FIG. 2.

Figure 3:
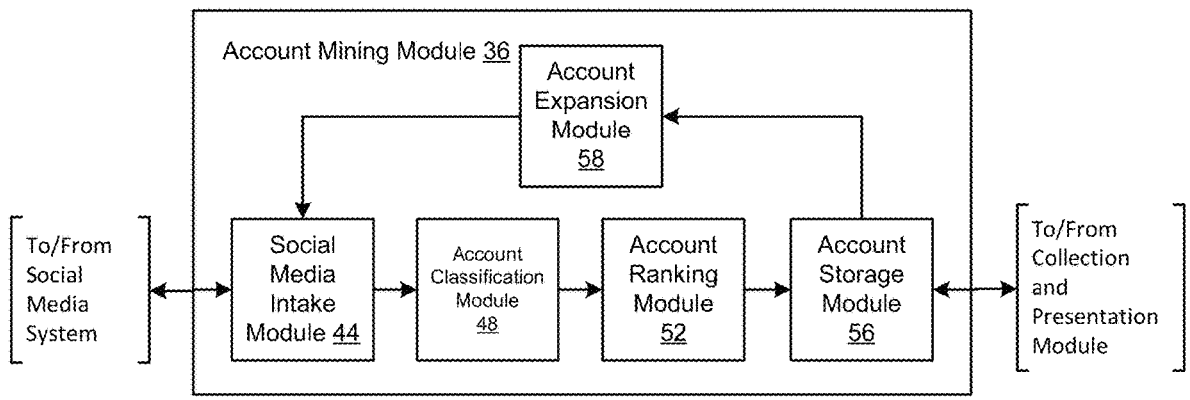
FIG. 3 is a schematic diagram depicting an embodiment of an account mining module of a social media knowledge base system.

FIG. 3 depicts an embodiment of the account mining module 36, including a social media intake module 44, an account classification module 48, an account ranking module 52, an account storage module 56, and an account base expansion module 58. The social media intake module 44 retrieves, via the communication interface 30 of the social media system 24, account information for selected accounts and postings of the social media system 24 for processing by the account mining module 36. The account classification module 48 classifies the retrieved accounts into one or more categories of high importance or influence to provide an improved basis for further processing, storage and presentation. The account ranking module 52 generates a ranking of a perceived importance or influence of the classified accounts to determine those of the greatest importance or influence for storage and posting collection and presentation. The account storage module 56 stores the classified accounts of the perceived greatest importance or influence in one or more account databases for posting collection and presentation. The account expansion module 58 identifies further accounts of potential high importance or influence for intake and processing by the account mining module 36, based on those already identified as being of high importance or influence, in order to improve the base of important or influential accounts.

In embodiments, a module for mining important or influential accounts of the social media system may include only any subset of, or an alternative connection of, the features depicted in or discussed herein in regard to FIG. 3.

Figure 4:
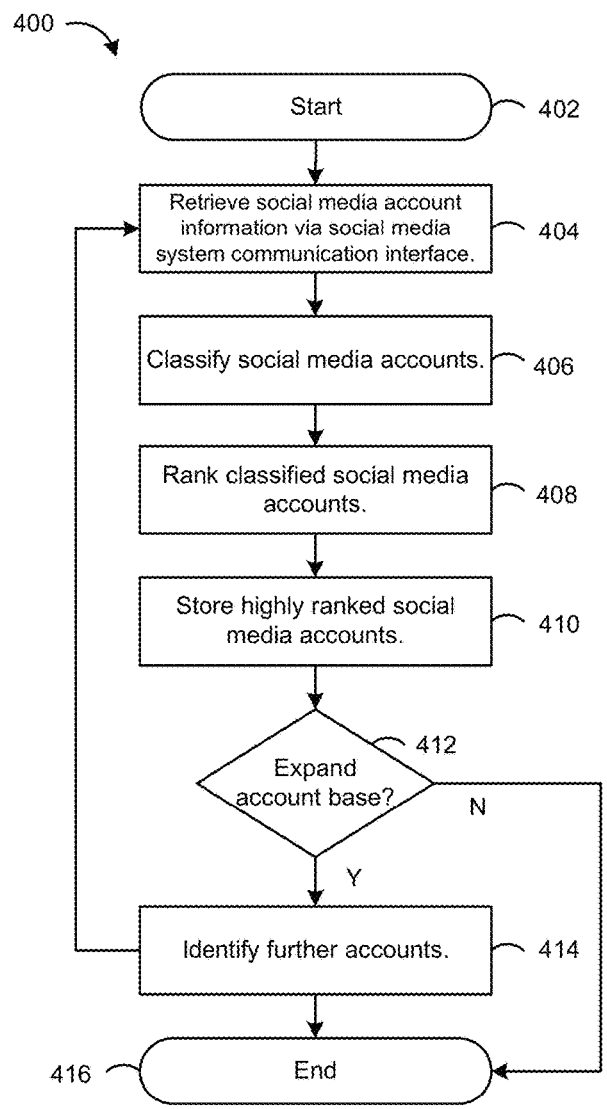
FIG. 4 is a flowchart depicting an embodiment of a method of mining important and influential accounts of a social media system.

FIG. 4 depicts an embodiment of a method 400 of mining important or influential accounts of a social media system. The method may be performed by or involving components of the account mining module 36 of FIG. 3. The method begins at step 402.

At step 404, account information for selected accounts and postings of the social media system 24 is retrieved via the communication interface 30 of the social media system 24. The account information is retrieved for selected accounts of perceived potential high importance or influence, such as one or more of verified accounts of the social media system, accounts recommended or otherwise identified as potentially of high importance or influence by users of the knowledge base system or others, accounts generating postings of a publically accessible stream of postings provided by the social media system, etc. The retrieval of the account information may be performed by the social media intake module 44.

At step 406, the accounts for which information is retrieved are classified into one or more account types or categories. The accounts are classified into one or more of account types (such as personal accounts belonging to persons or organization accounts belonging to organizations), subject matter type (such as government or politics, finance or economy, technology, news or journalism, etc.), organization type (such as government or news media, etc.) etc. The classification of the accounts may be performed by the account classification module 48.

At step 408, a ranking is generated for each account representing a perceived importance or influence of the account. The accounts are ranked based on, e.g., the retrieved account information, relationships of the accounts to other accounts in the social media system 24, perceived value and/or newsworthiness of postings of the account, etc. The ranking of the accounts may be performed by the account ranking module 52.

At step 410, relatively highly ranked social media accounts are stored in one or more account databases. The accounts are stored if their ranking is relatively high, such as if the generated ranking is above a predetermined threshold. The accounts may be stored according to their classifications, to enable an organized, effective and efficient presentation of the accounts and their postings by the posting collection and presentation module. The storing of the accounts may be performed by the account storage module 56.

At step 412, it is determined whether to further expand the base of accounts stored in the knowledge base system 28. The account base expansion is performed to a selected extent, such as according to an iterative process having a selected number of iterations. If it is determined to further expand the account base, the method proceeds to step 414. If it is determined to not further expand the account base, the method proceeds to step 416, where the method ends. The determination may be performed by the account base expansion module 58.

At step 414, further accounts of potential high importance or influence are identified. The account base is expanded based on the accounts already identified as important or influential, such as by identifying potential further accounts of high importance or influence based on relationships of the already identified accounts to other accounts, such as which accounts these accounts follow. The method then proceeds back to step 402, where the further identified accounts are processed according the above discussed steps. The identification of further accounts may be performed by the account base expansion module 58.

In embodiments, a method of mining important and influential accounts of a social media system may include only any subset of, or an alternative ordering of, the features depicted in or discussed above in regard to FIG. 4.

Figure 5:
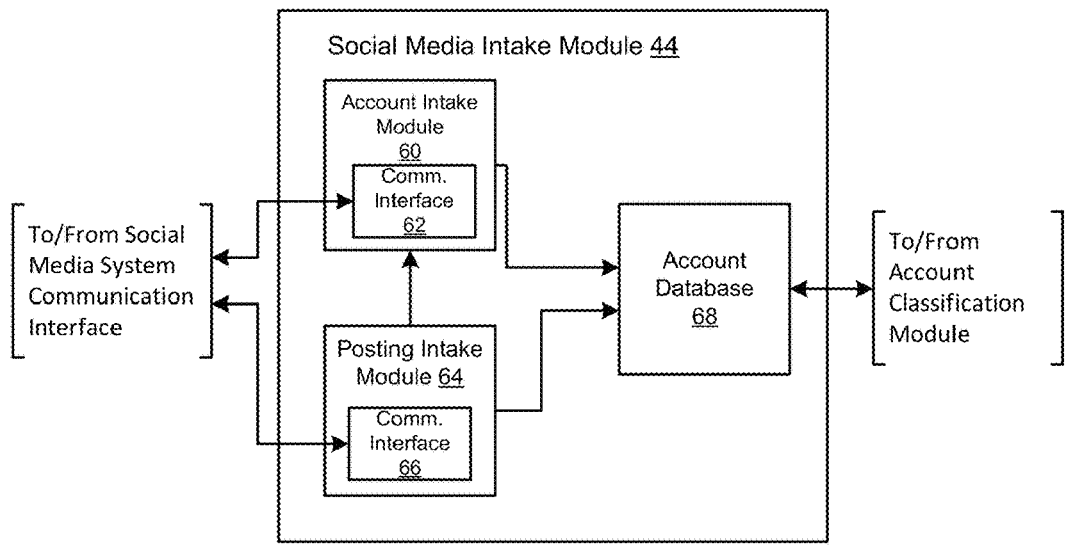
FIG. 5 is a schematic diagram depicting an embodiment of a social media intake module of the account mining module.

FIG. 5 depicts an embodiment of the social media intake module 44, including an account intake module 60, a posting intake module 64, and an account database 68. The account intake module 60 retrieves, using a communication interface 62 communicating with the communication interface 30 of the social media system 24 over the one or more communication networks 34, account information for selected social media accounts from the social media system 24, such as one or more of verified accounts of the social media system 24, or recommended accounts of the social media system 24. The posting intake module 64 retrieves, using a communication interface 66 communicating with the communication interface 30 of the social media system 24 over the one or more communication networks 34, selected postings from the social media system 24, such as from a data stream of selected postings provided by the social media system 24, and provides an identification of the accounts generating these postings for account information retrieval by the account intake module 60. The account database 68 stores, on a non-transitory machine-readable storage medium, the retrieved account information, such as including for the verified accounts, recommended accounts, and accounts resulting from the posting data stream.

In embodiments, a social media intake module may include only any subset of, or an alternative connection of, the features depicted in or discussed herein in regard to FIG. 5.

Figure 6:
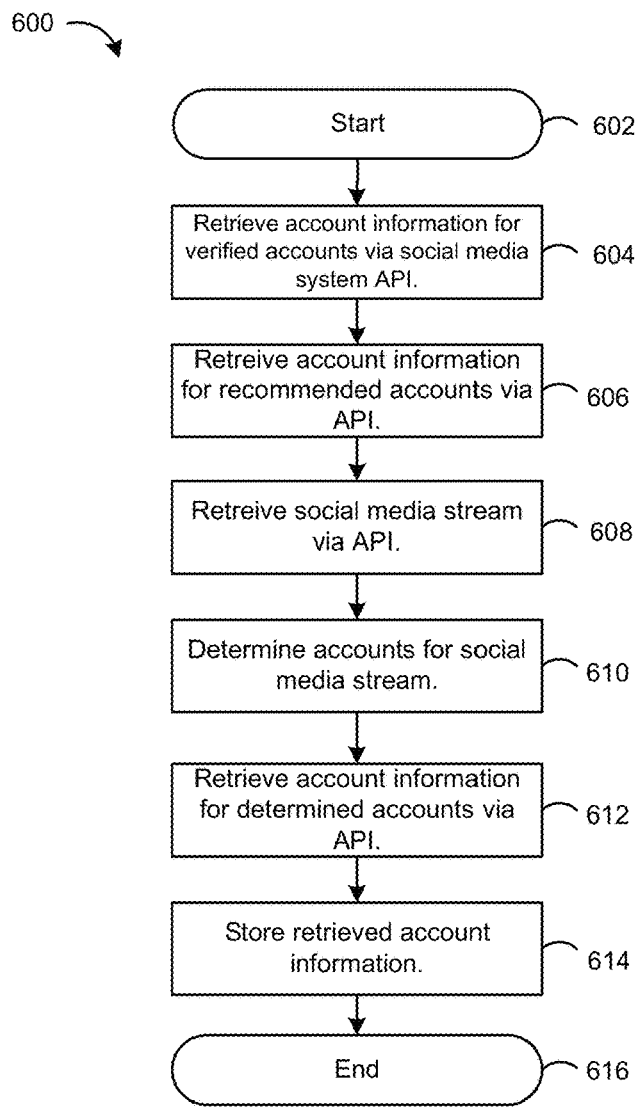
FIG. 6 is a flowchart depicting an embodiment of a method of retrieving account and posting information for accounts of a social media system.

FIG. 6 depicts an embodiment of a method 600 of retrieving account information for selected accounts of a social media system. The method may be performed by or involving components of the social media intake module 44 of FIG. 5. The method begins at step 602.

At step 604, account information for verified accounts of the social media system 24 is retrieved via the communication interface 30 of the social media system 24. The social media system 24 includes accounts from which postings to the social media system 24 originate. Each account includes account information in the form of one or more variables that are adjustable by the user and/or a function of a status or other attributes of the account. For example, the account information typically includes one or more of an account name, an account bio or description, an account image, a verified status, how many and/or which other accounts the account follows, how many and/or which other accounts follow the account, how many and/or which lists the account is included in, etc. Certain accounts of the social media system 24 may be verified accounts, which are accounts that the social media system 24 itself has verified as authentically belonging to the person claiming to have the account.

Account information may be retrieved from the social media system 24 using the communication interface 62 of the account intake module 60 communicating with the communication interface 30 of the social media system 24. In embodiments, the communication interface 30 of the social media system 24 implements one or more application programming interfaces (APIs). The API may respond to a variety of different requests by returning a variety of different requested information. In one example, the API returns requested pieces of account information for an identified account in response to a request for the account information for the identified account. Thus, in embodiments, the retrieving the account information for verified accounts includes executing one or more calls to the API by the account intake module 60, via its communication interface 62, identifying the account and requested account information, and receiving by the account intake module 60, via its communication interface 62, the account information for the verified account from the API in response.

The specific retrieved account information is a function of the downstream functionality provided by embodiments of the account mining module 36. In embodiments, the downstream functionality includes functionality based on one or more of an account name, and account bio, and account image, a number of followers of the account, a number of followees of the account, a number of lists that the account is included in, names of lists that the account is included in, etc., and retrieving the account information includes retrieving the relied upon specific account information.

Identification of the verified accounts for retrieving of account information for these accounts may be implemented in various different ways. In one embodiment, a list of verified accounts is maintained, and account information for accounts on the list of verified accounts is retrieved. In another embodiment, the social media intake module may poll the API of the social media system 24 for each account of the social media system to determine whether that account is verified, and account information retrieved for those accounts that are verified.

Figure 7:
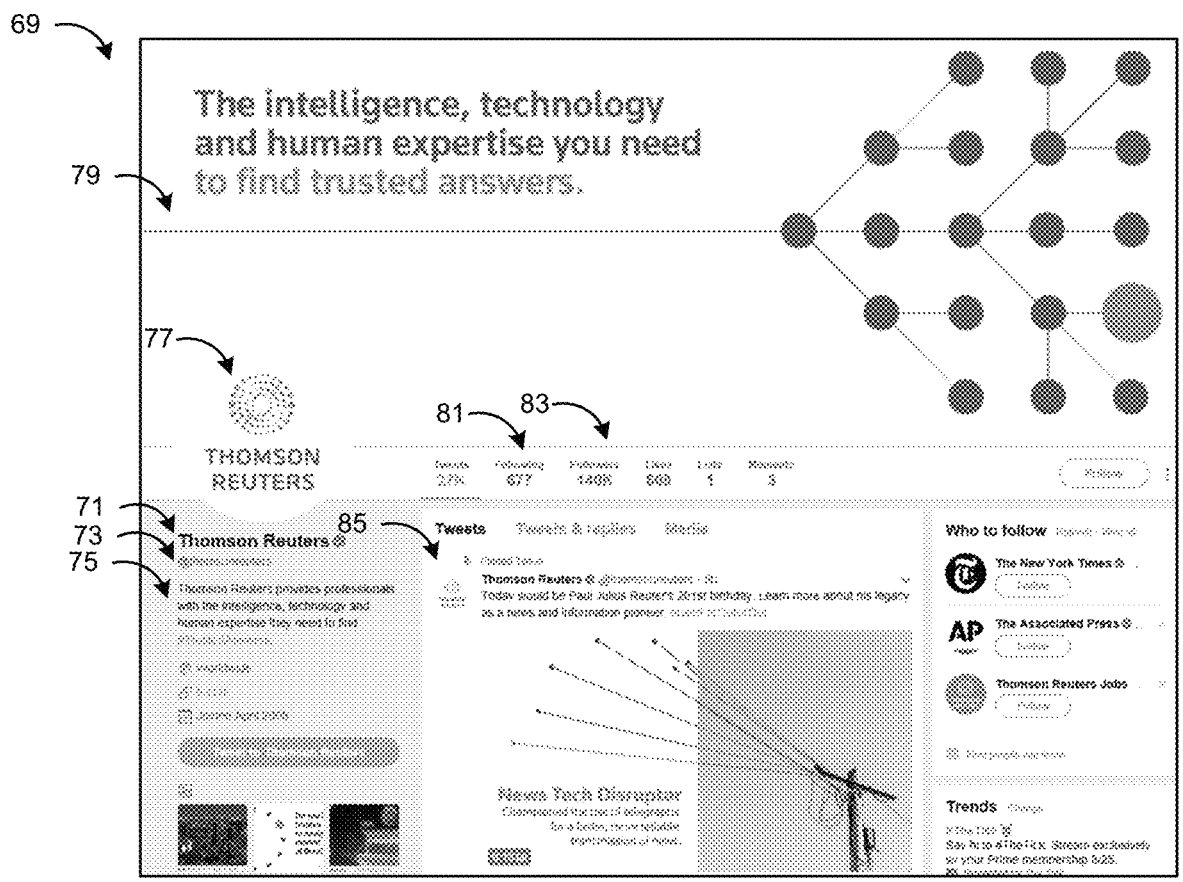
FIG. 7 depicts an embodiment of a view of an account of a social media system.

FIG. 7 depicts an embodiment of a view of an account 69 of a social media system provided to a user system. The view 69 includes account information, including an account name 71, an account address 73, an account bio 75, an account profile image 77, and account header image 79, a number of accounts that the account follows 81, a number of followers of the account 83, recent postings of the account 85, etc.

Returning to FIG. 6, at step 606, account information for recommended accounts of the social media system 24 is retrieved via the communication interface 30 of the social media system 24. The recommended accounts may be recommended for consideration by the account mining module 36 by users of the social media knowledge base system 28 or otherwise. For example, the knowledge base system 28 may include as part of a user interface generated by a user interface module 160 (shown in FIG. 22) of the collection and presentation module 40 a form or other user interface element for users to use to recommend accounts for consideration. The recommended accounts need not be verified accounts. The account information for the recommended accounts is retrieved in the same manner as discussed above for the account information retrieval of step 604.

At step 608, a selected set of social media postings of the social media system 24 is retrieved via the communication interface 30 of the social media system 24. The social media system 24 includes postings from accounts of the social media system 24. Each posting includes posting information in the form of one or more variables that are a function of a status or other attributes of posting and/or account originating the posting. For example, the posting information typically includes one or more of a content and/or text of the posting, an account name of the account that posted the posting, a time of the posting, etc.

The selected social media postings may be retrieved from the social media system 24 by the communication interface 66 of the posting intake module 64 communicating with the communication interface 30 of the social media system 24. In embodiments, the one or more APIs implemented by the communication interface 30 of the social media system 24 provides posting information in addition to account information. In one example, the API provides a publically available stream of the selected set of social media postings.

The selected postings may be a subset of the total social media postings of the social media system 24, such as a predetermined portion of the total postings made available by social media system 24 through the API. Thus, in one embodiment, the retrieving the social media postings includes establishing a connection to the API by the posting intake module 64, via its communication interface 66, to receive the stream of the selected set of postings from the API.

Figure 8:
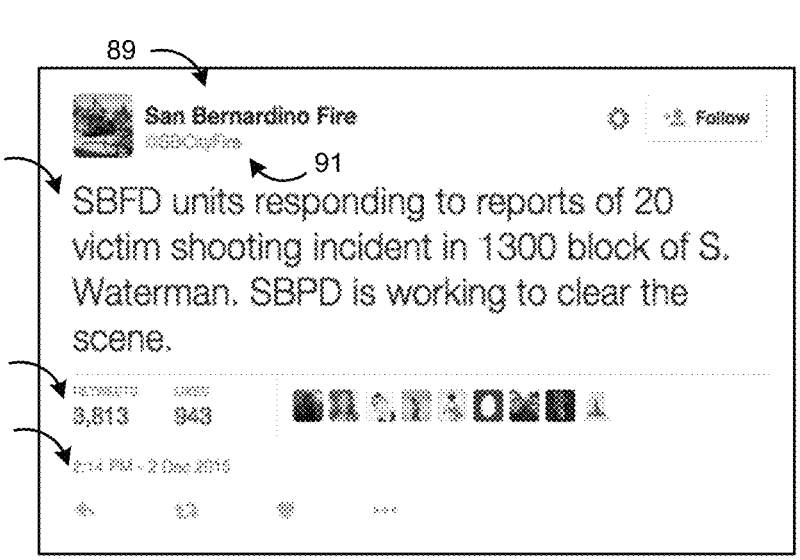
FIG. 8 depicts an embodiment of a view of a posting of a social media system.

FIG. 8 depicts an embodiment of a view of a posting 87 of an account of a social media system provided to a user system. The view 87 includes posting information, including an account name 89 of the account originating the posting, an account address 91 of the account originating the posting, a posting text and/or content 93, a number of repostings 95 of the posting, a time 97 of the posting, etc.

Returning to FIG. 6, at step 610, accounts originating the retrieved social media postings are determined. The accounts are determined from the posting information of the retrieved postings, such as the account name for the posting, etc. The determining of the originating accounts may be performed by the posting intake module 64.

At step 612, account information for the accounts originating the retrieved social media postings is retrieved via the communication interface 30 of the social media system 24. The account information for the originating accounts is retrieved in the same manner as discussed above for the account information retrieval of step 604.

At step 614, the account information retrieved in steps 604, 606, and 612 for the verified accounts, recommended accounts, and selected social media postings is stored. The storage of the account information may be performed by the account database 68, which stores data in database structures on a non-transitory machine-readable storage medium. The method ends at step 616.

In embodiments, a method of retrieving account information for selected accounts of a social media system may include only any subset of, or an alternative ordering of, the features depicted in or discussed above in regard to FIG. 6.

Figure 9:
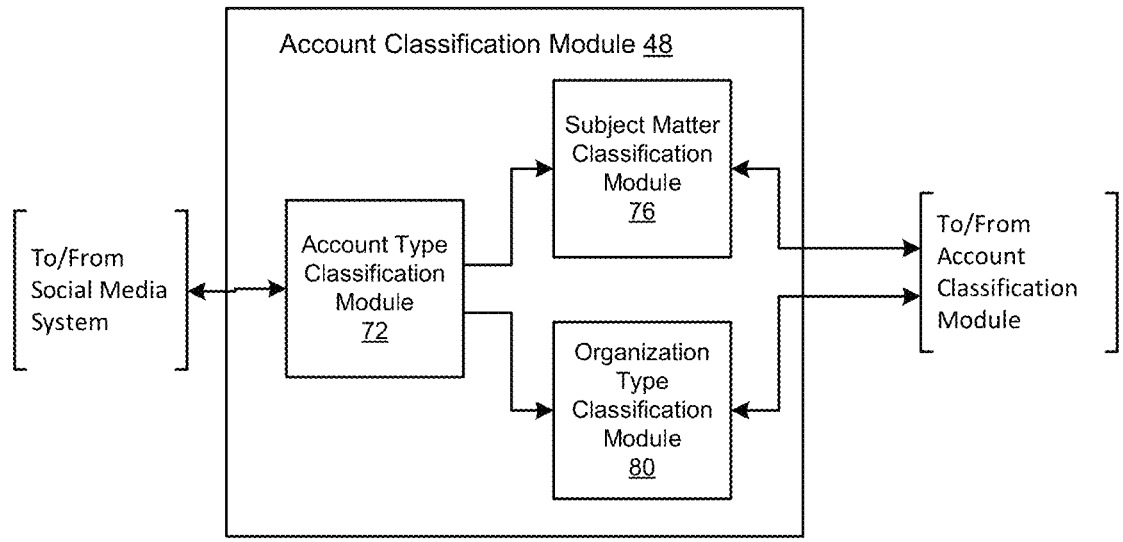
FIG. 9 is a schematic diagram depicting an embodiment of an account classification module of the account mining module.

FIG. 9 depicts an embodiment of the account classification module 48, including an account type classification module 72, a subject matter classification module 76, and an organization type classification module 80. For each account identified by the account intake module 60, the account type classification module 72 classifies an account type of the account, such as as either a personal account belonging to an individual or an organization account belonging to an organization, based on the account information for that account. For each personal account, the subject matter classification module 76 classifies a subject matter of the account, such as into one or more of government and politics, finance and economy, technology, news and journalism, etc., based on the account information for that account. For each organization account, the organization type classification module 80 classifies an organization type of the account, such as into government or news media, based on the account information.

In embodiments, an account classification module may include only any subset of, or an alternative connection of, the features depicted in or discussed herein in regard to FIG. 9.

Figure 10:
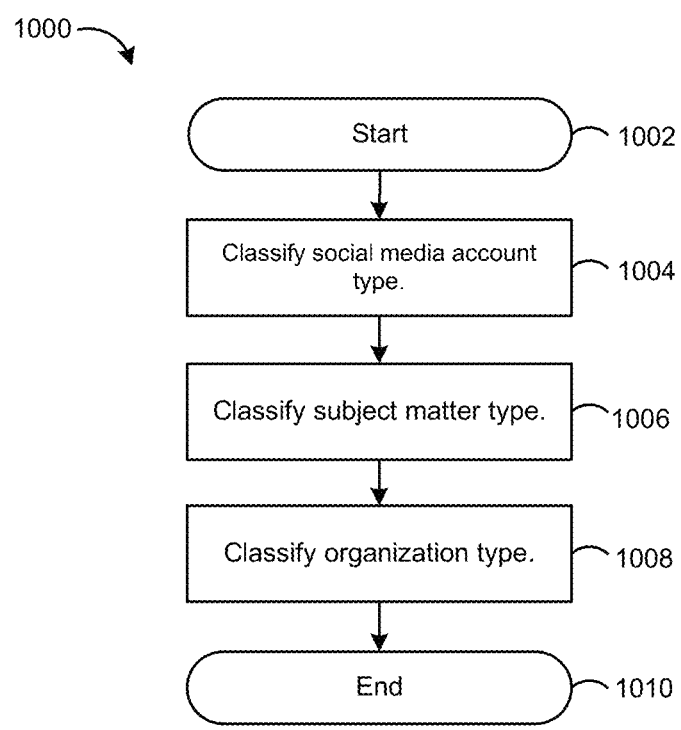
FIG. 10 is a flowchart depicting an embodiment of a method of classifying accounts of a social media system.

FIG. 10 depicts an embodiment of a method 1000 of classifying accounts of a social media system. The method may be performed by or involving components of the account classification module 48 of FIG. 9. The method begins at step 1002.

At step 1004, an account type of an identified account of the social media system 24 is classified. The account type is classified into one of a plurality of different account types, such as as either a personal account belonging to an individual (such as a subject matter expert or thought leader) or an organization account belonging to an organization (such as a company or government entity). The account type is classified based on the account information retrieved for that account, such as based on one or more of a name of the account, a bio of the account, an image of the account, etc. For example, the classifying of the account type may include one or steps or features of embodiments of the systems and methods of FIGS. 11-12 discussed below. The account type classifying may be performed by the account type classification module 72.

At step 1006, a subject matter of an identified account of the social media system 24 is classified. In embodiments, the subject matter of accounts classified as personal accounts is classified, as personal accounts of high importance or social influence tend to be of subject matter experts or thought leaders in specific subject matter domains. The subject matter is classified based on the account information or related information retrieved for that account, such as based on one or more of a bio of the account, names of lists in which the account is included, etc. For example, the classifying of the subject matter domain may include one or steps or features of embodiments of the systems or methods of FIG. 13-14 discussed below. The subject matter classifying may be performed by the subject matter classification module 76.

At step 1008, an organization type of an identified account of the social media system 24 is classified. The organization type of accounts classified as organization accounts is classified, as organization accounts of high importance or social influence tend to be of specific types such as government or news media organizations. The organization type is classified based on the account information retrieved for that account, such as based on one or more of a location of the account, a name of the account, etc. For example, the classifying of the organization type may include one or steps or features of embodiments of the systems and methods of FIG. 15-16 discussed below. The organization type classifying may be performed by the organization type classification module 80. The method ends at step 1010.

In embodiments, a method of classifying accounts of a social media system may include only any subset of, or an alternative ordering of, the features depicted in or discussed above in regard to FIG. 10.

Figure 11:
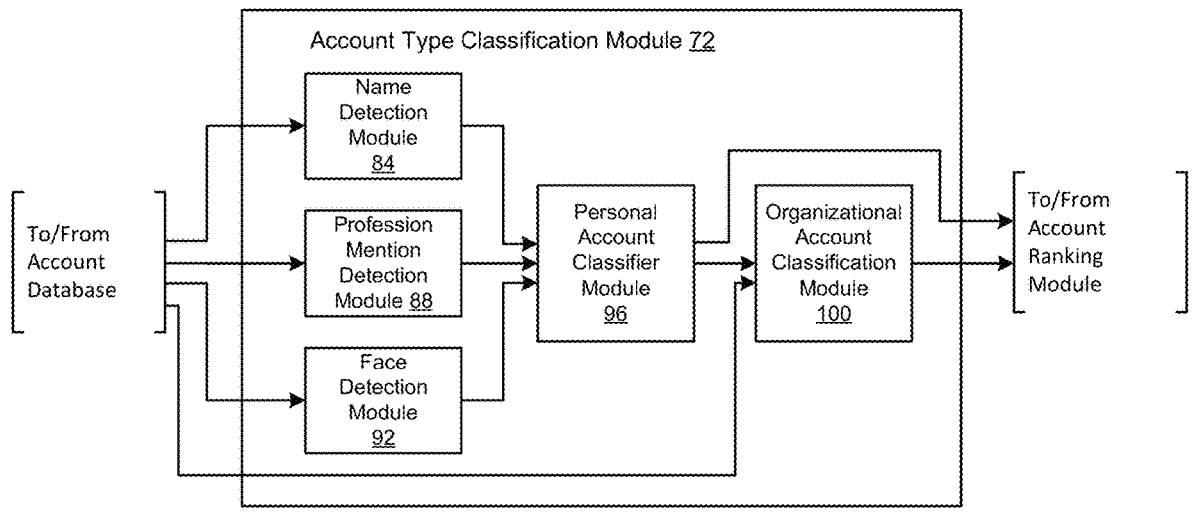
FIG. 11 is a schematic diagram depicting an embodiment of an account type classification module of the account mining module.

FIG. 11 depicts an embodiment of the account type classification module 72, including a name detection module 84, a profession mention detection module 88, a face detection module 82, a personal account classifier module 96, and an organization account classifier module 100. The name detection module 84 detects whether the account information, such as the account name, includes a personal name. The profession detection module 88 detects whether the account information, such as the account bio, includes a mention of a profession. The face detection module 92 detects whether the account information, such as an account image, includes a face. The personal account classifier module 96 classifies the account type as either a personal account or not based on outputs of one or more of the name detection module 84, profession mention detection module 88, and face detection module 92. The organization account classification module 100 classifies the accounts that are not personal accounts as either an organization account or an unknown account type.

In embodiments, an account type classification module may include only any subset of, or an alternative connection of, the features depicted in or discussed herein in regard to FIG. 11.

Figure 12:
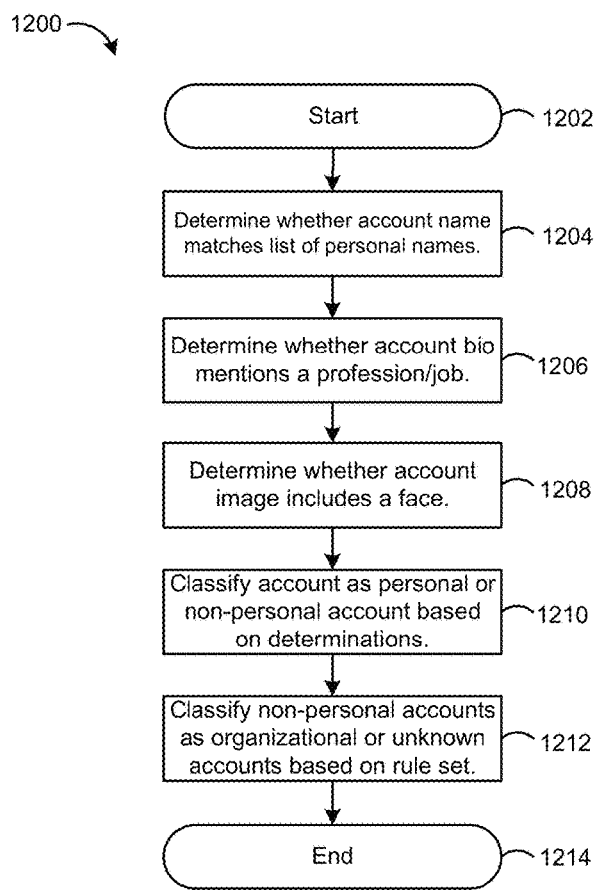
FIG. 12 is a flowchart depicting an embodiment of a method of classifying account types of accounts of a social media system.

FIG. 12 depicts an embodiment of a method 1200 of classifying the account type of accounts of a social media system. The method may be performed by or involving components of the account type classification module 72 of FIG. 11. The method begins at step 1102.

At step 1204, it is determined whether the account name of the account includes any names in a predetermined list of personal names. A personal account will often include in the account name the personal name or at least a portion of the personal name of the individual to whom the account belongs. The determining compares the account name to a predetermined list of personal names to determine if any portion of the account name matches an entry in the list of personal names. The list of personal names may include given names, i.e., first names, as this may provide a more general basis for comparison. The comparison may determine whether an exact match or an approximate match to a predetermined degree of closeness exists between a portion of the account name and an entry in the list of personal names. The output of the determination may include one or more of whether a match exists, the personal name that matches, etc. The determining may be performed by the name detection module 84.

At step 1206, it is determined whether the account bio of the account includes a mention of a profession. A personal account of high importance or influence will often be of a subject matter expert or thought leader, who will often include in the account bio an indication of the profession with which they are involved. The determining may search the account bio for the existence of one or more words from a predetermined list of words associated with professions, such as engineer, programmer, lawyer, attorney, legal, banker, financial industry, finance, etc. The comparison may determine either whether an exact match or an approximate match exits to a predetermined degree of closeness exists. The output of the determination may include one or more of whether a match exists, what the matching mention is, etc. The determining may be performed by the profession mention detection module 88.

At step 1208, it is determined whether the account image includes a face. A personal account will often include as the account image a picture of the individual to whom the account belongs. The determining may perform a facial detection algorithm on the image to determine whether it includes at least a portion of a face. The output of the determination may include whether a face or portion of a face was detected. The determining may be performed by the face detection module 92.

At step 1210, the account is classified as either a personal account or not a personal account based on one or more of the name, profession mention and face detections. The classification may be performed as a binary classification using a supervised machine learning algorithm trained using name detection, profession mention detection and face detection training signals. A variety of different supervised machine learning algorithms may be used, such as Frank-Wolfe vector machine, adaptive boosting, support vector machines, decision trees, random forests, Bayesian networks, neural networks, logistic regression, or extensions thereof. Alternatively, a different type of classification algorithm may be used, such as evaluating the detection signals using a classification rule set. The output of the classification may be an indication of whether the account is a personal account or not a personal account. The classifying may be performed by the personal account classification module 96.

At step 1212, the accounts classified as not personal accounts are classified as either an organization account or an unknown account type based on the account information. The classification may be performed by applying a rule set to the account information. The rule set may detect whether the account information, such as the account name, account bio, account location, etc., includes one or more of a predetermined list of organization names, such as fire department, police department, newspaper, company, etc. Alternatively, the classification may be performed as a binary classification using a supervised machine learning algorithm trained using account information training signals, such as one or more of a variety of different supervised machine learning algorithms, such as Frank-Wolfe vector machine, adaptive boosting, support vector machines, decision trees, random forests, Bayesian networks, neural networks, logistic regression, or extensions thereof. The output of the classification may be an indication of whether the account is an organization account or an unknown account type. The classifying may be performed by the organization type classification module 100. The method ends at step 1214.

In embodiments, a method of classifying the account type of accounts of a social media system may include only any subset of, or an alternative ordering of, the features depicted in or discussed above in regard to FIG. 12.

Figure 13:
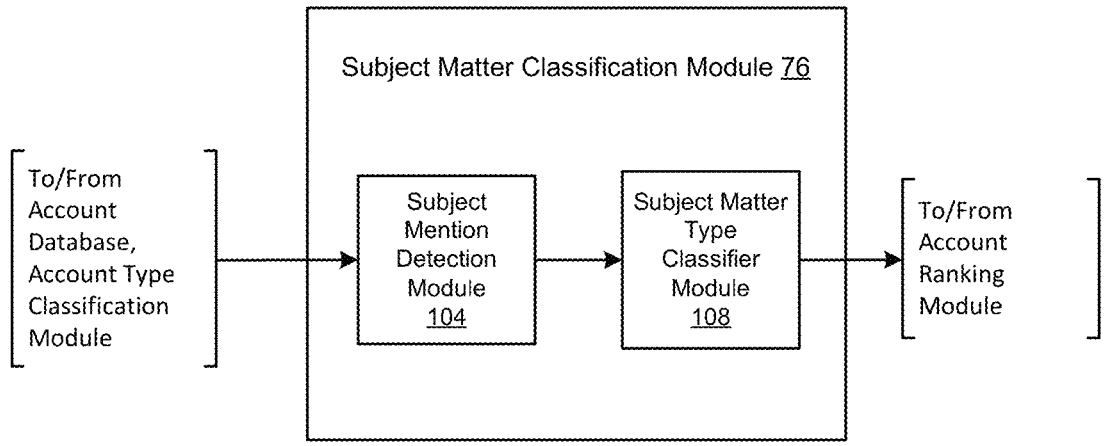
FIG. 13 is a schematic diagram depicting an embodiment of a subject matter classification module of the account mining module.

FIG. 13 depicts an embodiment of the subject matter classification module 76, including a subject mention detection module 104 and a subject matter classification module 108. The subject mention detection module 104 detects whether the account information or related information, such as the account bio or names of lists including the account, includes a mention of a subject. The subject matter classification module 108 classifies the subject matter of the account based on the output of the subject mention detection module 104.

In embodiments, a subject matter classification module may include only any subset of, or an alternative connection of, the features depicted in or discussed herein in regard to FIG. 13.

Figure 14:
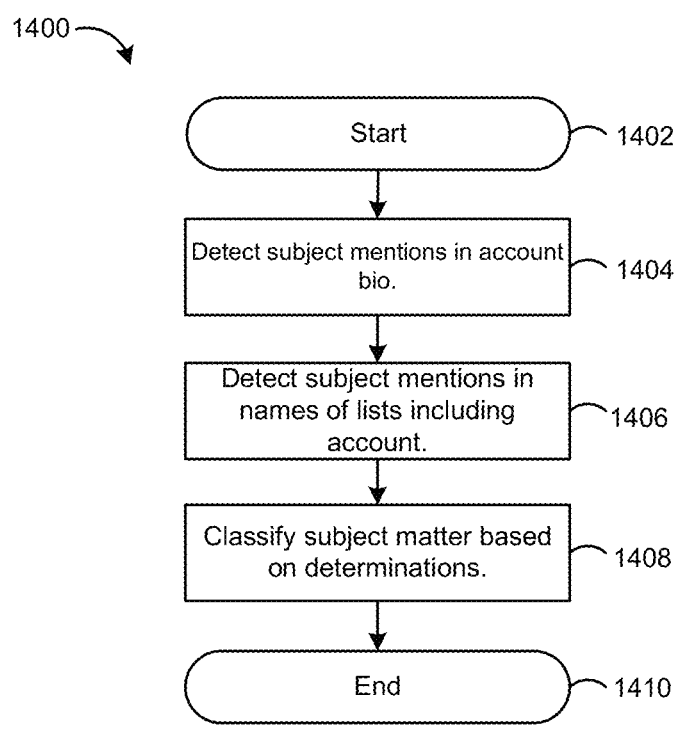
FIG. 14 is a flowchart depicting an embodiment of a method of classifying the subject matter of accounts of a social media system.

FIG. 14 depicts an embodiment of a method 1400 of classifying the subject matter of accounts of a social media system. The method may be performed by or involving components of the subject matter classification module 76 of FIG. 13. The method begins at step 1402.

At step 1404, it is determined whether the account bio of the account includes a mention of a subject matter. A personal account of high importance or influence will often be of a subject matter expert or thought leader, who often include in the account bio an indication of the subject matter with which they are involved. The determining may search the account bio for the existence of one or more words from a predetermined list of words associated with subject matter domains, such as engineering, science, finance, law, programming, etc. The comparison may determine either whether an exact match exists or an approximate match to a predetermined degree of closeness exists. The output of the determination may include one or more of whether a match exists, what the matching mention is, etc. The determining may be performed by the subject mention detection module 104.

At step 1406, it is determined whether names of lists including the account as a member include a mention of a subject matter. Social media systems may support the creation of lists, or groups, of accounts by users for various purposes, such as to enable users to aggregate accounts for efficient viewing of their postings etc. Users may access views of a list of accounts to view postings of the accounts included in the list, subscribe to the list to see the postings in a timeline of postings that they see, etc. In creating lists, users typically name the lists according to a unifying concept to which the accounts in the list may adhere, which typically includes a mention of a unifying subject matter to which the accounts that are members of the list are generally directed.

Figure 15:
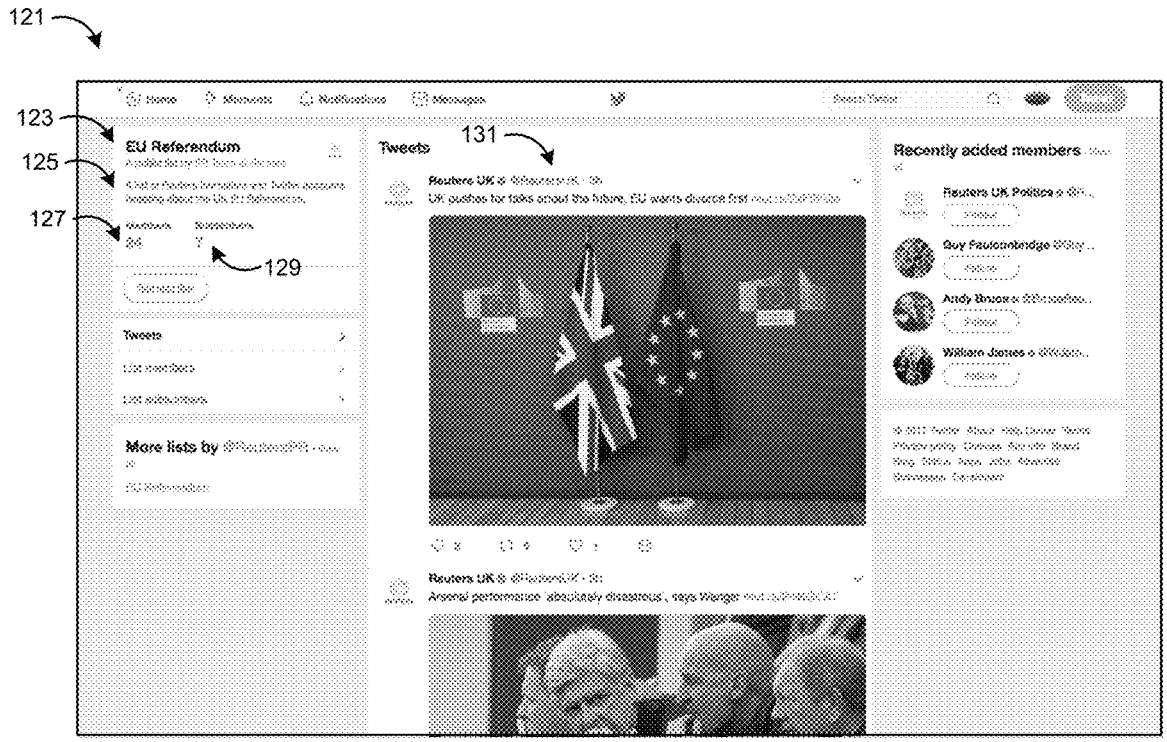
FIG. 15 depicts an embodiment of a view of a list of a social media system.

FIG. 15 depicts an embodiment view of a list 121 provided by a social media system to a user system. The view 121 includes list information, including a name of the list 123, a description of the list 125, a number of members of the list (i.e., accounts included in the list) 127, a number of subscribers to the list (i.e., accounts that see postings of the list in a timeline) 129, and recent postings of members of the list 131, etc.

Figure 16:
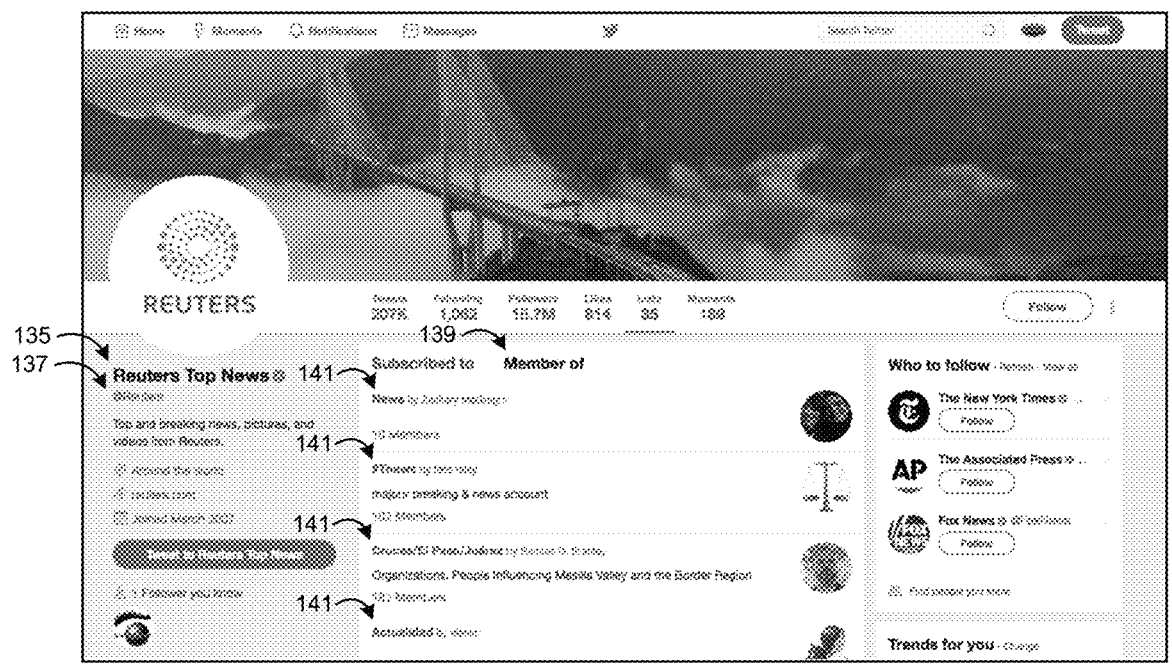
FIG. 16 depicts an embodiment of view of an account a social media system.

FIG. 16 depicts an embodiment of view of an account 133 of a social media system provided to a user system. The view 133 includes account information, including an account name 135, an account address 137, and a portion 139 showing names of lists 141 that include the account as a member, etc.

The determining of step 1406 may determine from the retrieved account information the names of lists to which the account has been added (i.e., has been included as a member), and search the names of the lists for the existence of one or more words from a predetermined list of words associated with subject matter domains, such as such as engineering, science, finance, law, programming, etc. The comparison may determine either whether an exact match or an approximate match to a predetermined degree of closeness exists. The output of the determination may include one or more of whether a match exists, what the matching mention is, etc. The determining may be performed by the subject mention detection module 104.

At step 1408, the subject matter of the account is classified as one of a plurality of different subject matter domains based on subject mention determinations form the account bio and names of lists including the account. The classification may be performed as a multi-class classification using a supervised machine learning algorithm trained using subject matter mention detection training signals. A variety of different supervised machine learning algorithms may be used, such as Frank-Wolfe vector machine, adaptive boosting, support vector machines, decision trees, random forests, Bayesian networks, neural networks, logistic regression, or extensions thereof. Alternatively, a different type of classification algorithm may be used, such as evaluating the detection signals using a classification rule set. The output of the classification may be an indication of which of a plurality of different subject matter domains the account is directed to, such as to government and/or politics, finance and/or economy, technology, news and/or journalism, or others. The classifying may be performed by the subject matter classification module 108. The method ends at step 1410.

In embodiments, a method of classifying the subject matter of accounts of a social media system may include only any subset of, or an alternative ordering of, the features depicted in or discussed above in regard to FIG. 14.

Figure 17:
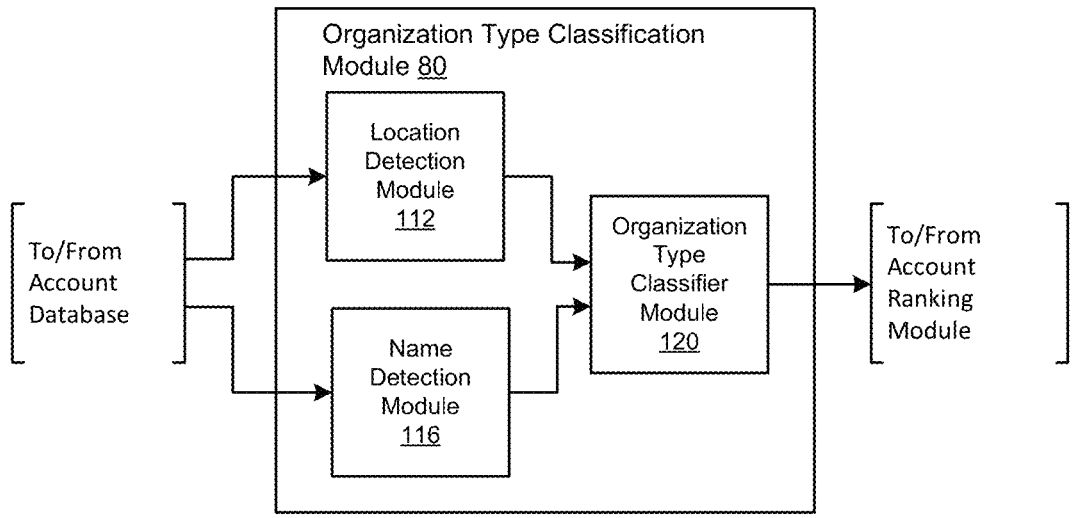
FIG. 17 is a schematic diagram depicting an embodiment of an organization type classification module of the account mining module.

FIG. 17 depicts an embodiment of the organization type classification module 80, including a location detection module 112, a name detection module 116, and an organization type classification module 120. The location detection module 112 detects whether the account information, such as the account location, includes a location. The name detection module 116 detects whether the account information, such as the account name, includes an organization name. The organization type classification module 120 classifies the organization type of the account based on the output of one or more of the location and name detection modules 112, 116.

In embodiments, an organization type classification module may include only any subset of, or an alternative connection of, the features depicted in or discussed herein in regard to FIG. 17.

Figure 18:
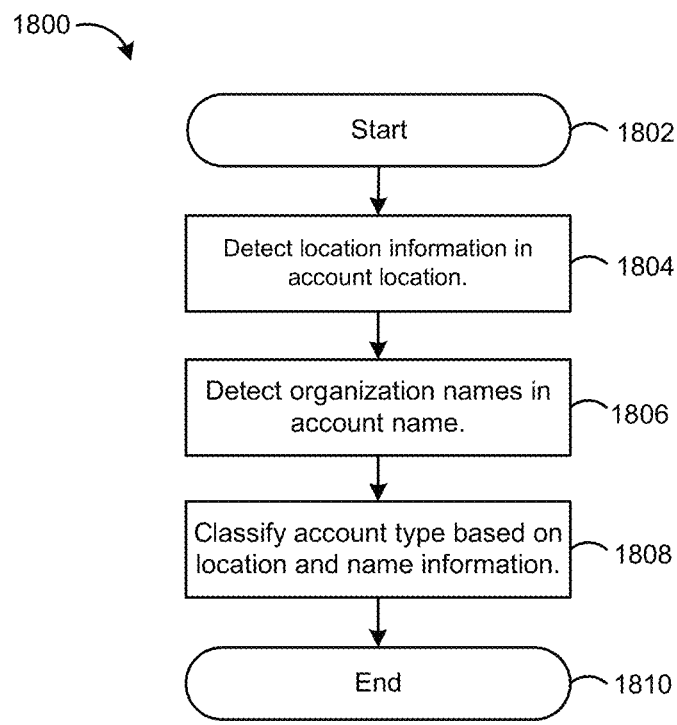
FIG. 18 is a flowchart depicting an embodiment of a method of classifying the organization type of accounts of a social media system.

FIG. 18 depicts an embodiment of a method 1800 of classifying the organization type of accounts of a social media system. The method may be performed by or involving components of the subject domain classification module 80 of FIG. 17. The method begins at step 1802.

At step 1804, it is determined whether the account location of the account includes one or more predetermined locations. An organization account will often include a correct location in the account location of the account information. The determining may compare the account location to a predetermined list of known locations, such as New York City, London, Missoula, etc., to determine if the account location matches an entry in the list. The comparison may determine either whether an exact match or an approximate match to a predetermined degree of closeness exists. The output of the determination may include one or more of whether a match exists, the predetermined location that matches, etc. The determining may be performed by the location detection module 112.

At step 1806, it is determined whether the account name of the account includes one or more predetermined organization names. An organization account will often include a correct name of the organization in the account name. The determining may compare the account name to a predetermined list of organization names or name components, such as Company, Incorporated, Inc., News, Times, Television, etc., to determine if the account name matches an entry in the list. The comparison may determine either whether an exact match or an approximate match to a predetermined degree of closeness exists. The output of the determination may include one or more of whether a match exists, the predetermined organization name that matches, etc. The determining may be performed by the name detection module 116.

At step 1808, the organization type is classified as one of a plurality of different organization types based on one or more of the location and organization name detections. The classification may be performed as a binary or multi-class classification using a supervised machine learning algorithm trained using location and organization name detection training signals. A variety of different supervised machine learning algorithms may be used, such as Frank-Wolfe vector machine, adaptive boosting, support vector machines, decision trees, random forests, Bayesian networks, neural networks, logistic regression, or extensions thereof. Alternatively, a different type of classification algorithm may be used, such as evaluating the detection signals using a classification rule set. The output of the classification may be an indication of which of a plurality of different organization types the account belongs to, such as either news and/or media, governmental, etc. The classifying may be performed by the organization type classification module 120. The method ends at step 1810.

In embodiments, a method of classifying the organization type of accounts of a social media system may include only any subset of, or an alternative ordering of, the features depicted in or discussed above in regard to FIG. 18.

Figure 19:
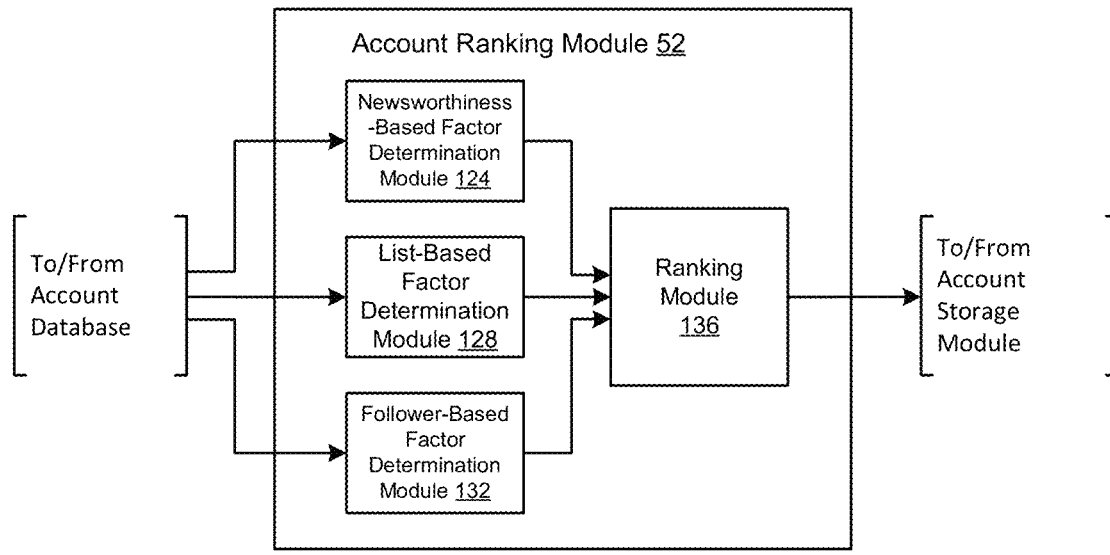
FIG. 19 is a schematic diagram depicting an embodiment of an account ranking module of the account mining module.

FIG. 19 depicts an embodiment of the account ranking module 52, including a newsworthiness-based factor determination module 124, a list-based factor determination module 128, a follower-based factor determination module 132, and a ranking module 136. The newsworthiness-based factor determination module 124 determines a factor that may be used in the ranking of the importance or influence of the account based on a newsworthiness of the account and/or its postings. The list-based factor determination module 128 determines a factor that may be used in the ranking of the importance or influence of the account based on lists in which the account is included. The follower-based factor determination module 132 determines a factor that may be used in the ranking of the importance or influence of the account based on followers and/or followees of the account. The ranking module 136 determines a ranking of the importance or influence of the account based on the outputs of one or more of the newsworthiness-based factor determination module 124, list-based factor determination module 128, and follower-based factor determination module 132.

In embodiments, an account ranking module may include only any subset of, or an alternative connection of, the features depicted in or discussed herein in regard to FIG. 19.

Figure 20:
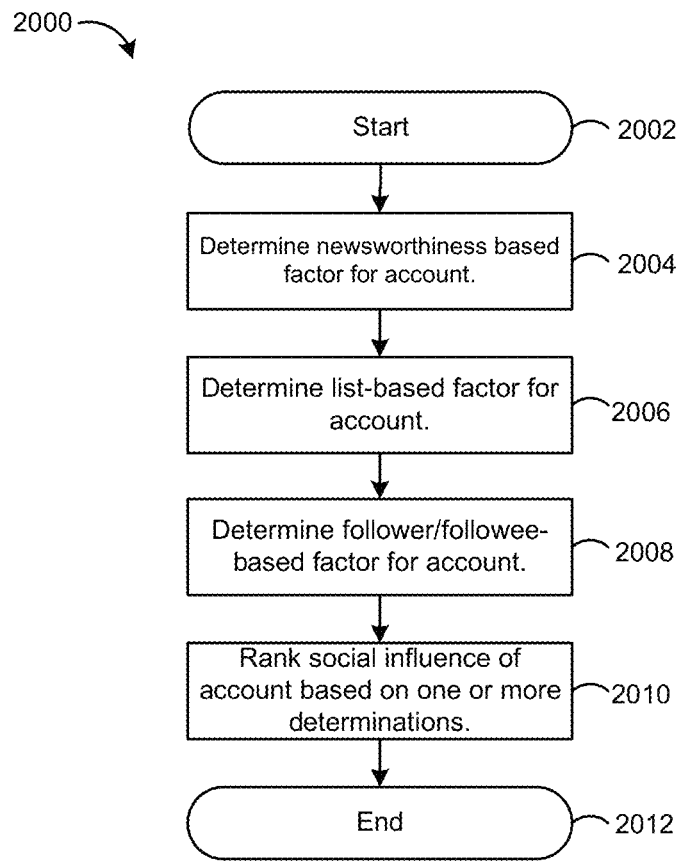
FIG. 20 is a flowchart depicting an embodiment of a method of ranking accounts of a social media system.

FIG. 20 depicts an embodiment of a method 2000 of ranking accounts of a social media system. The method may be performed by or involving components of the account ranking module 52 of FIG. 19. The method begins at step 2002.

At step 2004, a newsworthiness-based factor for use in ranking the importance or influence of an account is determined based on the postings of the account. An important or influential account will typically generate postings having a relatively high newsworthiness as a relatively high rate. The determining may determine a newsworthiness of the account, as a function of the newsworthiness of individual postings and the rate of postings, using a supervised machine learning algorithm trained using exemplary posting training signals. A variety of different supervised machine learning algorithms may be used, such as Frank-Wolfe vector machine, adaptive boosting, support vector machines, decision trees, random forests, Bayesian networks, neural networks, logistic regression, or extensions thereof. The output of the newsworthiness determination may be rating of the newsworthiness of the account in the form of either a numerical rating, e.g., from 0.0 to 1.0, or a categorical rating, e.g., low, medium, or high. The determining may be performed by the newsworthiness-based factor determination module 124.

At step 2006, a list-based factor for use in ranking the importance or influence of an account is determined based on lists in which the account is included. An important or influential account will typically be included on lists having a large number of subscribers. The determining may determine a list-based factor as a function of the number of lists that the account is included in and a number of subscribers of those lists. For example, the function may add a weight for each list based on the number of subscribers for that list to determine an overall factor. Other formulations are also possible. The determination may optionally omit lists with a low number of subscribers. The output of the list-based determination may be rating of the importance or influence of the account in the form of either a numerical rating, e.g., from 0.0 to 1.0, or categorical rating, e.g., low, medium, or high. The determining may be performed by the list-based factor determination module 128.

At step 2008, a follower-based factor for use in ranking the importance or influence of an account is determined based on followers and/or followees of the account. An important or influential account will typically having a relatively high number of followers, i.e., accounts that follow the account, and a relatively low number of followees, i.e., accounts that the account follows. The determining may determine a follower-based factor as a function of the number of followers of that the account and the number of followees of that account. For example, the function may determine a numerical quantity as the number of followers minus the number of followees. Other formulations are also possible. The output of the follower-based determination may be rating of the importance or influence of the account in the form of either a numerical rating, e.g., from 0.0 to 1.0, or categorical rating, e.g., low, medium, or high. The determining may be performed by the follower-based factor determination module 132.

At step 2010, a ranking of the importance or influence of the account is determined based on one or more of the newsworthiness-based ranking factor, list-based ranking factor and a follower-based ranking factor. The determining may determine an account ranking as a combinatorial function of the newsworthiness-based ranking factor, list-based ranking factor and a follower-based ranking factor. For example, the function may determine a numerical quantity as a function of an addition of the factors. Other formulations are also possible. The output of the ranking determination may be an overall ranking of the importance or influence of the account in the form of a numerical ranking, e.g., from 0.0 to 1.0, or categorical ranking, e.g., low, medium, or high. The ranking may be performed by the ranking module 136. The method ends at step 2012.

In embodiments, a method of ranking accounts of a social media system may include only any subset of, or an alternative ordering of, the features depicted in or discussed above in regard to FIG. 20.

Figure 21:
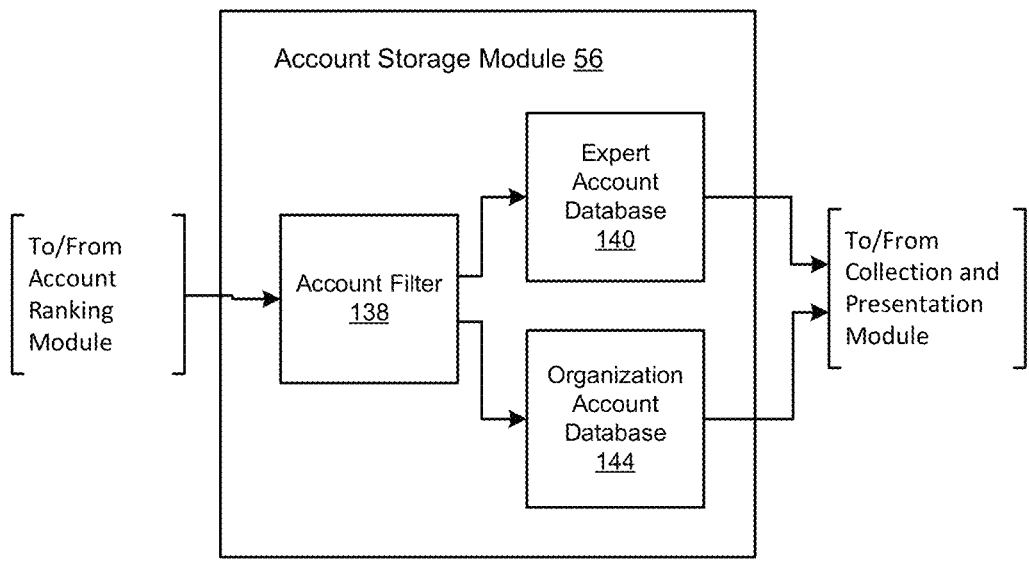
FIG. 21 is a schematic diagram depicting an embodiment of an account storage module of the account mining module.

FIG. 21 depicts an embodiment of the account storage module 56, including an account filter 138, an expert account database 140, and an organization account database 144. The account filter 138 determines whether an account is sufficiently highly ranked for importance or influence to warrant storage. The expert account database 140 is a database stored on a non-transitory machine-readable storage medium that stores a representation of those personal accounts that are sufficiently highly ranked for importance or influence. The organization account database 144 is a database stored on a non-transitory machine-readable storage medium that stores a representation of these organization accounts that are sufficiently highly ranked for importance or influence.

In embodiments, an account storage module may include only any subset of, or an alternative connection of, the features depicted in or discussed herein in regard to FIG. 21.

Figure 22:
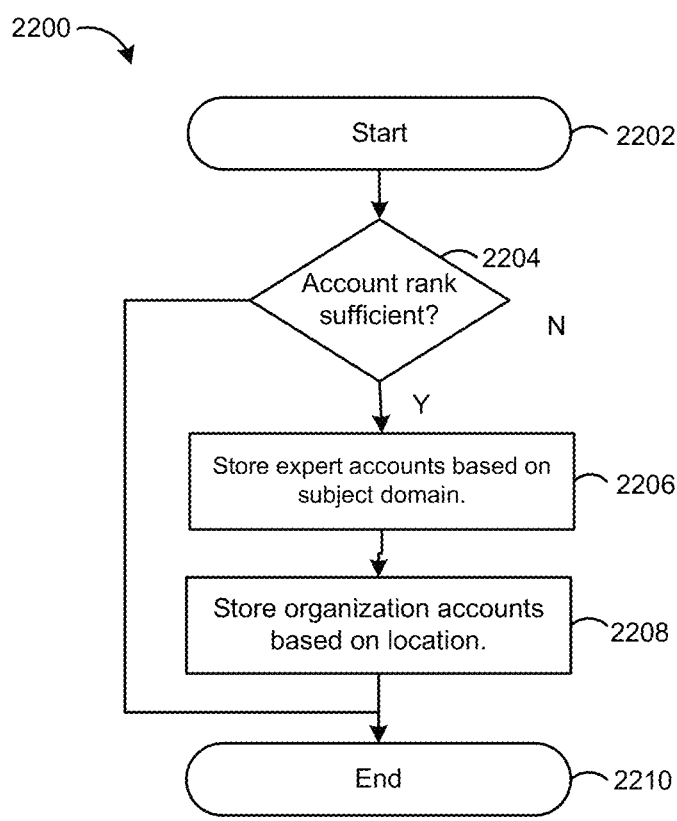
FIG. 22 is a flowchart depicting an embodiment of a method of storing representations of accounts of a social media system.

FIG. 22 depicts an embodiment of a method 2200 of storing a representation of an account of a social media system. The method may be performed by or involving components of the account storage module 56 of FIG. 21. The method begins at step 2202.

At step 2204, for the account being processed, it is determined whether the account ranking is above a predetermined threshold. If the account ranking is above the threshold, the method proceeds to step 2206, whereas if the account ranking is below the threshold, the method proceeds to step 2210, where the method ends. The predetermined threshold may be selected to calibrate the performance of the account mining performed by the account mining module 36. For example, a relatively low threshold may be chosen to include relatively more accounts in the account databases 140, 144, although potentially of a collectively relatively lower importance or influence, whereas a relatively higher threshold may be chosen to include relatively fewer accounts in the account databases 140, 144, although potentially of a collectively relatively higher importance or influence. The determining may be performed by the account filter module 138.

At step 2206, for a personal account, a representation of the account is stored in the expert account database 140. The expert account database 140 is a database that stores data on a non-transitory machine-readable storage medium. The representation of the account may include one or more of account information, such as an account name, account address, account bio, etc., the subject matter type of the account, the ranking of the account, etc. The accounts may be organized within the expert account database 140 according to, e.g., the subject matter type and ranking.

At step 2208, for an organization account, a representation of the account is stored in the organization account database 144. The organization account database 144 is a database that stores data on a non-transitory machine-readable storage medium. The representation of the account may include one or more of account information, such as an account name, account address, account bio, etc., the organization type of the account, the ranking of the account, etc. The accounts may be organized within the organization account database 144 according to, e.g., the organization type and ranking.

In embodiments, a method of storing representations of accounts of a social media system may include only any subset of, or an alternative ordering of, the features depicted in or discussed above in regard to FIG. 22.

Returning to FIG. 3, as indicated above, the account expansion module 58 identifies further accounts of potential high importance or influence for intake and processing by the account mining module 36 based on the accounts of high importance or influence already identified, in order to improve the base of important or influential accounts.

Figure 23:
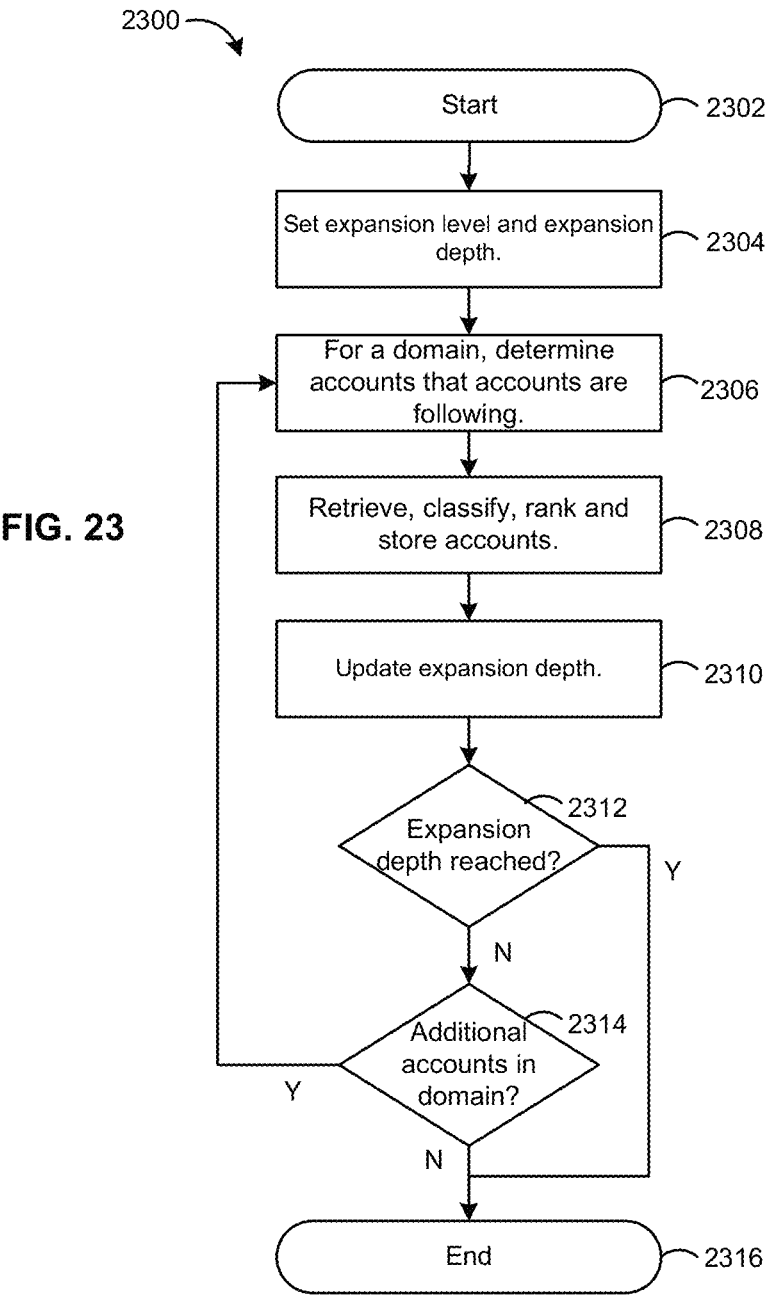
FIG. 23 is a flowchart depicting an embodiment of a method of expanding a collection of accounts of a social media system.

FIG. 23 depicts an embodiment of a method 2300 of expanding a collection of expert accounts of a social media system. The method may be performed by or involving components of the account expansion module 58 of FIG. 3. The method begins at step 2302.

At step 2304, expansion level and expansion depth variables are set. The expansion level indicates the level of expansion being processed. The expansion depth indicates the level of expansion up to which expansion will be performed. For example, at the beginning of account base expansion, the expansion level is set to 0, and the expansion depth may be set to calibrate performance of the expansion, such as, e.g., 2 for a relatively smaller amounts of expansion, or, e.g., 4, or even higher numbers, for relatively larger amounts of expansion.

At step 2306, for a subject matter type, the accounts that are followed by the accounts that have been classified, ranked and stored for that subject matter type are determined. The accounts that are followed by the accounts identified, ranked, stored etc. in a subject matter type typically represent other accounts in that subject matter type of high importance or influence. The accounts may be determined from the retrieved account information of the accounts identified, ranked, stored etc. for the subject matter type and/or by retrieving further account information for those accounts.

At step 2308, the determined accounts are processed to retrieve account information, classify, and rank the accounts, and store highly ranked accounts, such as discussed above in regard to the embodiments of the systems and methods of FIGS. 3-22. Thus, to the extent that the newly identified accounts contain account of high importance or influence, as determined by this process, the account base is increased.

At step 2310, the expansion depth is updated. The expansion depth is updated by incrementing the expansion depth. For example, upon completion of the first expansion level, the expansion depth is incremented from 0 to 1.

At step 2312, it is determined whether the expansion level has reached the expansion depth. For example, if the expansion depth had initially been set to 2, upon completion of the first level of expansion, the expansion level would be updated 1, which has not yet reached the expansion depth. If at step 2312 it is determined that the expansion depth has been reached, the method proceeds to step 2316, where the method ends. If at step 2312 it is determined that the expansion depth has not yet been reached, the method proceeds to step 2314.

At step 2314, it is determined whether the previously completed expansion level has added accounts of sufficient importance or influence to the account database 140 for the subject matter type as a result of the processing of step 2308. If at step 2314 it is determined that the expansion has added new important or influential accounts to the subject matter type, the method proceeds back to step 2306, with the newly added accounts forming the basis for further expansion, i.e., the accounts that those newly added accounts follow are determined at step 2306, etc. If at step 2314 it is determined that the expansion has not added new accounts to the subject matter type, the method proceeds to step 2316, where the method ends.

The method of FIG. 23 may be performed for each subject matter type. The method of FIG. 23 also may be performed for each organization type.

In embodiments, a method of expanding an base of accounts of a social media system may include only any subset of, or an alternative ordering of, the features depicted in or discussed above in regard to FIG. 23.

Figure 24:
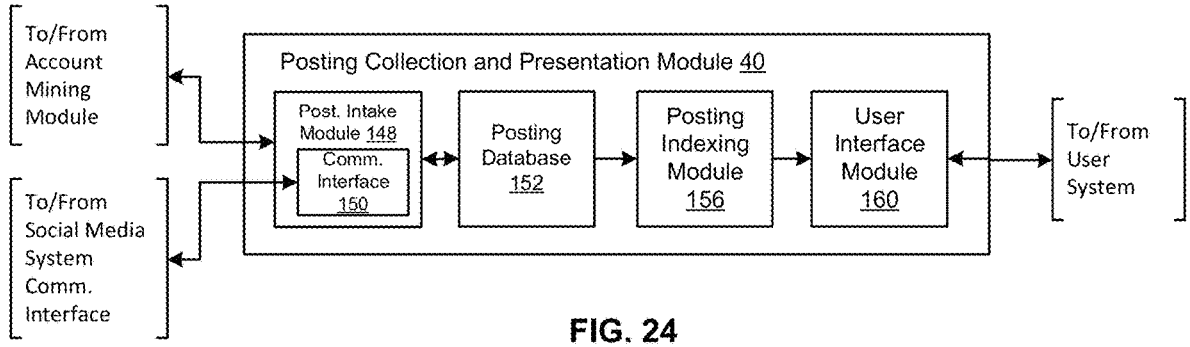
FIG. 24 is a schematic diagram depicting an embodiment of a posting collection and presentation module of the social media knowledge base system.

FIG. 24 depicts an embodiment of the posting collection and presentation module 40, including a posting intake module 148, a posting database 152, a posting indexing module 156, and a user interface module 160. The posting intake module 148 retrieves, using a communication interface 150 communicating with the communication interface 30 of the social media system 24, postings of the accounts of high importance or influence stored in the account database 140, 144 of the account mining module 36. The posting database 152 is a database that stores the retrieved postings on a non-transitory machine-readable storage medium. The posting indexing module 156 generates and stores one or more indices of the retrieved postings for use in presentation to the user. The user interface module 160 generates and delivers for display on a display of the user system 32 at least one signal representing a user interface for presenting the collected postings of the social media accounts stored by the account mining module 36 organized according to one or more of account, account type, subject matter type, organization type, etc., which the user system 32 displays In embodiments, a posting collection and presentation module may include only any subset of, or an alternative connection of, the features depicted in or discussed herein in regard to FIG. 24.

Figure 25:
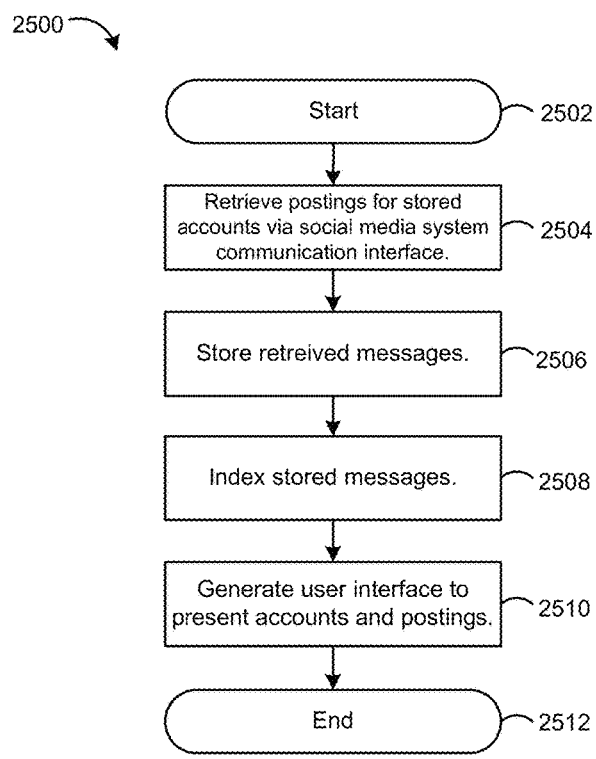
FIG. 25 is a flowchart depicting an embodiment of a method of collecting and presenting accounts and postings of a social media system.

FIG. 25 depicts an embodiment of a method 2500 of collecting and presenting postings of accounts of a social media system. The method may be performed by or involving components of the posting collection and presentation module 40 of FIG. 24. The method begins at step 2502.

At step 2504, postings from the accounts of high importance or influence identified and stored by the account mining module 36 are retrieved via the communication interface 30 of the social media system 24. The postings may be retrieved from the social media system 24 by the posting intake module 148 using its communication interface 150 to communicate with the communication interface 30 of the social media system 24 to request the postings for the accounts the social media system 24. In embodiments, the one or more APIs implemented by the communication interface 30 of the social media system 24 are configured to respond to requests for postings and/or posting information, such as identified postings or postings of an account, by returning the requested postings and/or posting information. Thus, in embodiments, the retrieving includes the posting intake module 148 using its communication interface 150 to request the postings from the one or more APIs of the social media system 24.

At step 2506, the retrieved postings are stored in the posting database 152. The posting database 152 is a database that stores data on a non-transitory machine-readable storage medium. The postings are stored in the posting database 152 for subsequent retrieval, processing and presentation by the posting and collection module 40.

At step 2508, one or more indices of the retrieved postings are generated. The indices are used to provide an various different organized presentations of the postings by the user interface module 160. The indices may index the postings according to one or more of: account information, posting information, account type, subject matter type, organization type, or ranking. The index generating may be performed by the posting indexing module 156.

At step 2510, one or more signals are generated representing a user interface to present the accounts of high importance or influence and the postings of the accounts of high importance or influence to the user via a display of the user system 32, which the user system 32 displays. The postings may be presented via the user interface in a manner to enable efficient review and searching by the user of the information represented by the postings. For example, the user interface may include one or more of: a portion presenting personal accounts of high importance or influence in order of ranking for a given subject matter type, a portion presenting organization accounts of high importance or influence in order of ranking for a given location, a portion containing postings of high importance or influence (i.e., those of the accounts of high importance or influence) organized according to time of posting of the posting and number of repostings (e.g., reTweets) of the posting, a portion containing locations on a map, a portion containing potential subject matter, organization or other key or index words, and a portion containing a graph of potentially related subject matter. The generating and delivery of the one or more signals representing the user interface for display on the display of the user system 32 may be performed by the user interface module 160. The method ends at step 2512.

In embodiments, a method of collecting and presenting postings of accounts of a social media system may include only any subset of, or an alternative ordering of, the features depicted in or discussed above in regard to FIG. 25.

Figure 26:
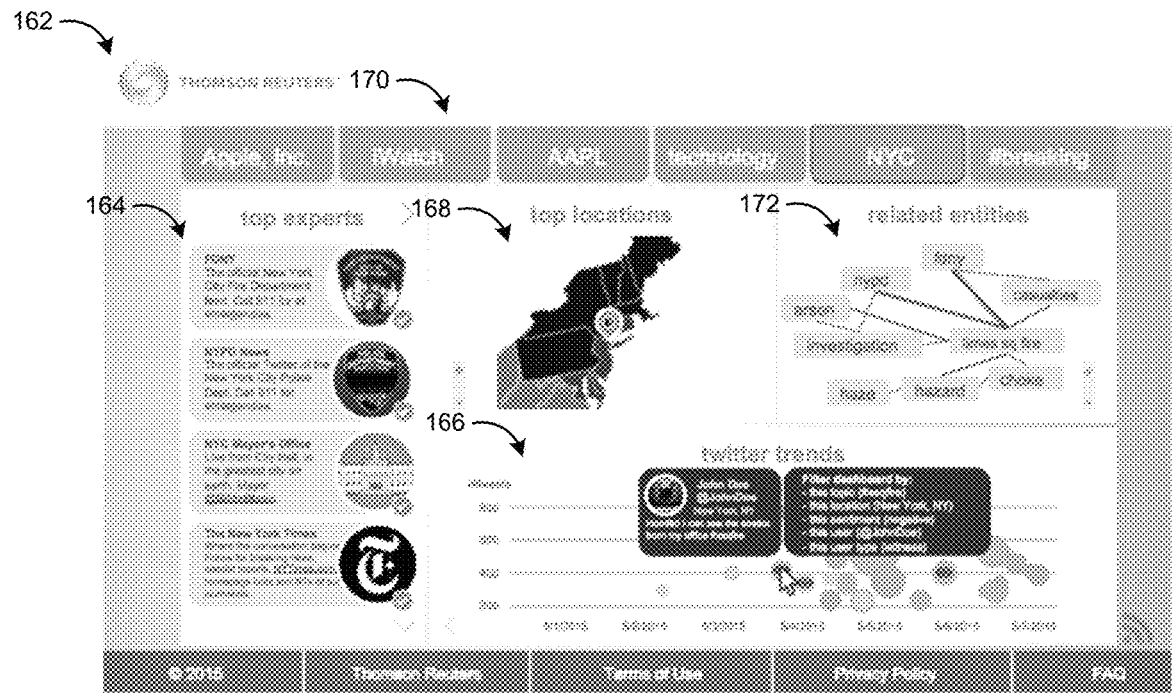
FIG. 26 depicts an embodiment of a user interface for presenting accounts and postings of a social media system to a user system.

FIG. 26 depicts an embodiment of a user interface 162 generated by the user interface module 160 for presentation to the user on the user system 32. The exemplary user interface 162 is organized to explore the location NYC, and includes a portion 164 presenting the highest ranked organization accounts in NYC, a portion 166 containing postings of these accounts organized horizontally according to time of posting of the posting and vertically according to number of repostings of the posting, a portion 168 containing NYC on a map, a portion 170 containing index words, and a portion 172 containing a graph of potentially related subject matter.

Figure 27:
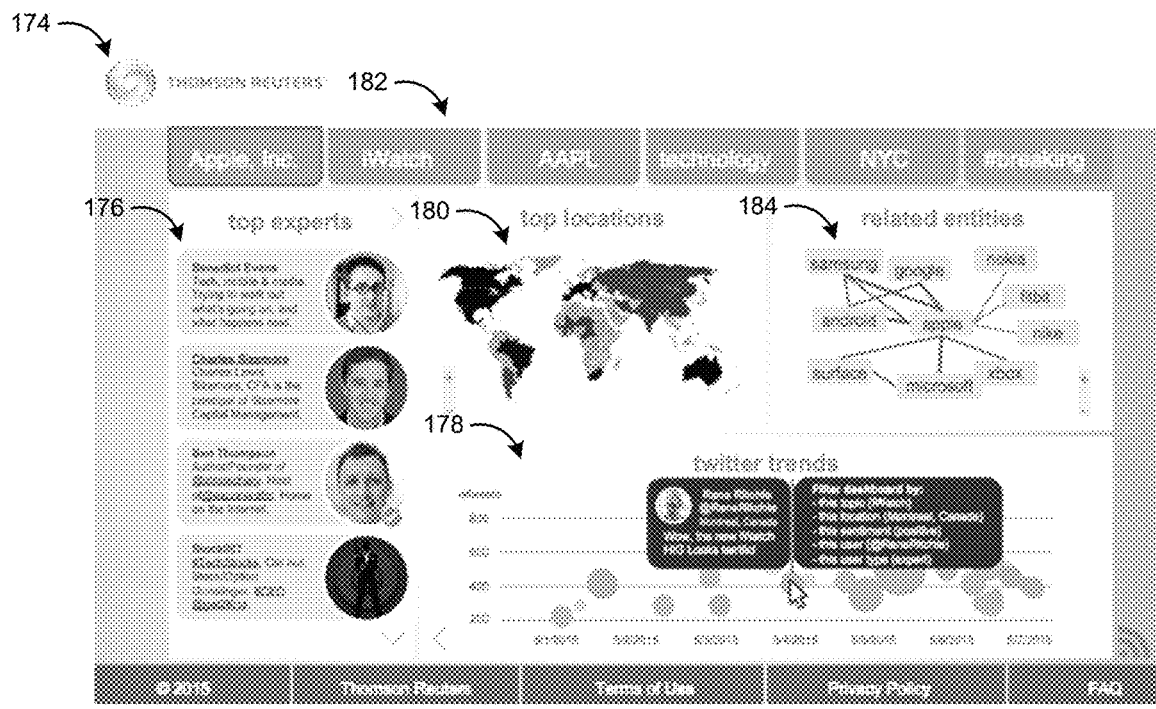
FIG. 27 depicts another embodiment of a user interface for presenting accounts and postings of a social media system to a user system.

FIG. 27 depicts another embodiment of a user interface 174 generated by the user interface module 160 for presentation to the user on the user system 32. The exemplary user interface 174 is organized to explore the company Apple, and includes a portion 176 presenting the highest ranked expert accounts for Apple, a portion 178 containing postings of these accounts organized horizontally according to time of posting of the posting and vertically according to number of repostings of the posting, a portion 180 containing locations related to Apple on a map, a portion 182 containing index words, and a portion 184 containing a graph of potentially related subject matter.

To compose graphs of potentially related subject matter for a given entity, postings of the social media system 24 may be processed to extract hashtags, account mentions, news links and entities such as person name, locations, and companies, etc., and then a link between two entities may be formed if their co-occurrence frequency in the analyzed postings is over a predetermined threshold.

Embodiments of the social media system 24, social media knowledge base system 28, and user system 32, and/or any individual one, subset, or all of the components thereof, may be implemented as hardware, software, or a mixture of hardware and software. For example, each of the social media system 24, social media knowledge base system 28, and user system 32, and/or any individual one, subset, or all of the components thereof, may be implemented using a processor and a non-transitory storage medium, where the non-transitory machine-readable storage medium includes program instructions that when executed by the processor perform embodiments of the functions of such components discussed herein. In embodiments, each of the social media system 24, social media knowledge base system 28, and user system 32, and/or any individual one, subset, or all of the components thereof, may be implemented using one or more computer systems, such as, e.g., a desktop computer, laptop computer, mobile computing device, network device, server, Internet server, cloud server, etc.

Figure 28:
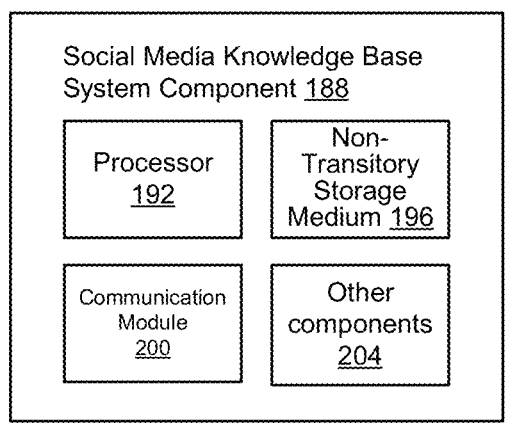
FIG. 28 is a schematic diagram depicting an embodiment of a computing system for implementing components of the social media knowledge base system.

FIG. 28 depicts an embodiment of a computer system 188 that may be used to implement the social media knowledge base system 28 and/or any individual one, subset, or all of the components thereof. The computer system 188 includes a processor 192, a non-transitory machine-readable storage medium 196, a communication module 200, and optionally other components 204. The processor 192 executes program instructions stored in the non-transitory machine-readable storage medium 196 to perform the functionality of the component it is implementing as discussed herein. The communication module 200 may be controlled by the processor 192 to communicate with other devices, such as the social media system 24 and/or user system 32, to perform the functionality of the component it is implementing as discussed herein. The optional other components may include any further components required by the computer system 188 to perform this functionality.

Additional embodiments of the social media system 24, social media knowledge base system 28, user system 32, and associated methods, as discussed herein, are possible. For example, any feature of any of the embodiments of these systems and methods described herein may be used in any other embodiment of these systems and methods. Also, embodiments of these systems and methods may include only any subset of the components or features of these systems and methods discussed herein.

What is claimed is:

1. A method of identifying and presenting accounts and postings of a social media system, the method comprising:
   retrieving, by a knowledge-base server system via at least one application programming interface (API) of the social media system, account information for a plurality of social media accounts;
   classifying, by the knowledge-base server system based on the retrieved account information, the plurality of social media accounts according to account type, wherein the classifying classifies each account of the plurality of social media accounts as one of: a personal account type, or an organization account type; and wherein the classifying for each account includes performing a detection of whether an image in the account information for the account includes a face;
   ranking, by the knowledge-base server system based on the retrieved account information, the plurality of social media accounts according to importance or influence, wherein the ranking for each account includes determining a ranking factor based on a newsworthiness of the account determined using a supervised machine learning algorithm, and ranking the plurality of social media accounts based on the ranking factor;
   storing, by the knowledge-base server system in an account database, a representation of a subset of the plurality of social media accounts having a ranking greater than a predetermined threshold;
   repeatedly retrieving over time, by the knowledge-base server system via the at least one API, postings of the stored subset of social media accounts;
   generating and storing, by the knowledge-base server system, indices for the retrieved postings of the subset of social media accounts, an index for each posting indicating the classified account type of a social media account of the subset of social media accounts corresponding to the posting; and
   generating and providing, by the knowledge-base server system to a user system, a signal representing a user interface, for display on a display of the user system, to present the retrieved social media postings for the stored subset of social media accounts organized according to account type and ranking, wherein the generated signal is a function of the stored indices for the retrieved postings of the subset of social media accounts, and is repeatedly updated over time as a function of the repeated retrieving of the postings of the stored subset of social media accounts.

2. The method of claim 1, wherein the classifying further classifies a subject matter type of at least one personal account based on the account information.

3. The method of claim 1, wherein the classifying further classifies an organization type of at least one organization account based on the account information.

4. The method of claim 1, wherein the classifying the account type as a personal account includes detecting personal information in the account information including at least one of: a personal name, a mention of a profession or a job, or a face.

5. The method of claim 4, wherein the classifying the account type as a personal account includes classifying the account as a personal account or not a personal account based on the detected personal information using a supervised machine learning classifier.

6. The method of claim 2, wherein the classifying the subject matter type of the at least one personal account includes detecting subject matter mentions in at least one of: the account information, or one or more lists listing the at least one personal account.

7. The method of claim 6, wherein the classifying the subject matter type of the at least one personal account further includes classifying the subject matter type based on the detected subject matter mentions using a supervised machine learning classifier.

8. The method of claim 3, wherein the classifying the organization type of the at least one organization account includes detecting a location and an organization name in the account information.

9. The method of claim 8, wherein the classifying the organization type of the at least one organization account further includes classifying the organization type based on the detected location and organization name using at least one rule set.

10. The method of claim 1, wherein the ranking further includes:
determining at least one of: a second ranking factor based on listing the account in lists of the social media system, or a third ranking factor based on followers of the account; and
ranking the plurality of social media accounts based on the at least one of the second ranking factor or third ranking factor.

11. The method of claim 10, wherein determining the second ranking factor based on listing the accounts in lists includes determining a number of lists in which the account is listed, and determining a number of accounts subscribed to the lists in which the account is listed.

12. The method of claim 10, wherein determining the third ranking factor based on followers includes determining a number of followers of the account in the social media system reduced by a number of accounts that the user or entity owning the account follows in the social media system.

13. The method of claim 1, wherein the plurality of social media accounts include at least one of verified accounts of the social media system, or recommended accounts of the social media system.

14. The method of claim 1, further comprising identifying the plurality of social media accounts by: retrieving, via the at least one API, social media postings of a social media posting stream provided by the social media system, and determining at least some of the plurality of social media accounts as accounts from which postings of the social media posting stream originate.

15. The method of claim 1, further comprising identifying further accounts for the retrieving, classifying, ranking and storing steps as accounts that are followed by the users or entities owning the subset of the plurality of social media accounts that are stored.

16. The method of claim 1, wherein the social media system is TWITTER®.

17. The method of claim 1, wherein the social media system includes at least one of: FACEBOOK®, INSTAGRAM®, SNAPCHAT®, TUMBLR®, PINTEREST®, FLICKR®, or REDDIT®.

18. The method of claim 1, wherein the retrieving the account information, the classifying, the ranking, the storing, the retrieving the postings, and the generating are performed using a processor.

19. The method of claim 18, wherein the storing stores the representation of the subset of the plurality of social media accounts in the account database on a non-transitory machine-readable storage medium.

20. The method of claim 1, wherein the retrieving the account information includes communicating by a communication interface of an account intake module with a communication interface of the social media system over one or more communication networks.

21. The method of claim 1, wherein the retrieving the postings includes communicating by a communication interface of a posting intake module with a communication interface of the social media system over one or more communication networks.

22. The method of claim 1, further comprising, upon classifying at least one of plurality of social media accounts as a personal account, classifying a subject matter type of the personal account based on the account information, wherein the classifying the subject matter type of the personal account includes detecting subject matter mentions in at least one of: the account information, or one or more lists listing including the at least one personal account.

23. The method of claim 1, wherein the determining the newsworthiness of the account determines the newsworthiness of the account as a function of a newsworthiness of individual postings of the account.

24. The method of claim 1, wherein the classifying for each account includes classifying the account based on the detection using a supervised machine learning classifier.

25. A non-transitory machine-readable storage medium including programming instructions, which when executed by at least one processor perform a method of identifying and presenting accounts and postings of a social media system, the method comprising:
retrieving, by a knowledge-base server system via at least one application programming interface (API) of the social media system, account information for a plurality of social media accounts;
classifying, by the knowledge-base server system based on the retrieved account information, the plurality of social media accounts according to account type, wherein the classifying classifies each account of the plurality of social media accounts as one of: a personal account type, or an organization account type; and wherein the classifying for each account includes performing a detection of whether an image in the account information for the account includes a face;
ranking, by the knowledge-base server system based on the retrieved account information, the plurality of social media accounts according to importance or influence, wherein the ranking for each account includes determining a ranking factor based on a newsworthiness of the account determined using a supervised machine learning algorithm, and ranking the plurality of social media accounts based on the ranking factor;
storing, by the knowledge-base server system in an account database, a representation of a subset of the plurality of social media accounts having a ranking greater than a predetermined threshold;
repeatedly retrieving over time, by the knowledge-base server system via the at least one API, postings of the stored subset of social media accounts;
generating and storing, by the knowledge-base server system, indices for the retrieved postings of the subset of social media accounts, an index for each posting indicating the classified account type of a social media account of the subset of social media accounts corresponding to the posting; and generating and providing, by the knowledge-base server system to a user system, a signal representing a user interface, for display on a display of the user system, to present the retrieved social media postings for the stored subset of social media accounts organized according to account type and ranking, wherein the generated signal is a function of the stored indices for the retrieved postings of the subset of social media accounts, and is repeatedly updated over time as a function of the repeated retrieving of the postings of the stored subset of social media accounts.

26. The non-transitory machine-readable storage medium of claim 25, wherein the classifying further classifies a subject matter type of at least one personal account based on the account information.

27. The non-transitory machine-readable storage medium of claim 25, wherein the classifying further classifies an organization type of at least one organization account based on the account information.

28. The non-transitory machine-readable storage medium of claim 25, wherein the ranking further includes determining at least one of: a ranking factor based on a newsworthiness of the account determined using a supervised machine learning algorithm, a second ranking factor based on inclusion in lists of the social media system of the account, or a third ranking factor based on followers of the account.

29. The non-transitory machine-readable storage medium of claim 25, wherein the plurality of social media accounts include at least one of: verified accounts of the social media system, recommended accounts of the social media system, or accounts determined from social media postings retrieved via the at least one API from the social media system.

30. The non-transitory machine-readable storage medium of claim 25, further comprising identifying further accounts for the retrieving, classifying, ranking and storing steps as accounts that are followed by the user or entity owning the subset of the plurality of social media accounts that are stored.

31. The non-transitory machine-readable storage medium of claim 25, wherein the social media system is TWITTER®.

32. A system for identifying and presenting accounts and postings of a social media system, the system comprising:
at least one processor;
a non-transitory machine-readable storage medium including programming instructions, which when executed by the at least one processor cause a method of determining and presenting postings of accounts in the social media system to be performed, the method including:
retrieving, by a knowledge-base server system via at least one application programming interface (API) of the social media system, account information for a plurality of social media accounts;
classifying, by the knowledge-base server system based on the retrieved account information, the plurality of social media accounts according to account type, wherein the classifying classifies each account of the plurality of social media accounts as one of: a personal account type, or an organization account type; and wherein the classifying for each account includes performing a detection of whether an image in the account information for the account includes a face;
ranking, by the knowledge-base server system based on the retrieved account information, the plurality of social media accounts according to importance or influence, wherein the ranking for each account includes determining a ranking factor based on a newsworthiness of the account determined using a supervised machine learning algorithm, and ranking the plurality of social media accounts based on the ranking factor;
storing, by the knowledge-base server system in an account database, a representation of a subset of the plurality of social media accounts having a ranking greater than a predetermined threshold;
repeatedly retrieving over time, by the knowledge-base server system via the at least one API, postings of the stored subset of social media accounts;
generating and storing, by the knowledge-base server system, indices for the retrieved postings of the subset of social media accounts, an index for each posting indicating the classified account type of a social media account of the subset of social media accounts corresponding to the posting; and
generating and providing, by the knowledge-base server system to a user system, a signal representing a user interface, for display on a display of the user system, to present the retrieved social media postings for the stored subset of social media accounts organized according to the classified account type and ranking, wherein the generated signal is a function of the stored indices for the retrieved postings of the subset of social media accounts, and is repeatedly updated over time as a function of the repeated retrieving of the postings of the stored subset of social media accounts.

33. The system of claim 32, wherein at least one of:
the classifying further classifies a subject matter type of at least one personal account based on the account information;
the classifying further classifies an organization type of at least one organization account based on the account information;
the ranking further includes determining at least one of: a second ranking factor based on inclusion of the account in lists of the social media system, or a third ranking factor based on followers of the account;
the plurality of social media accounts include at least one of: verified accounts of the social media system, recommended accounts of the social media system, or accounts determined from social media postings retrieved via the at least one API from the social media system;
further accounts for the retrieving, classifying, ranking and storing steps are identified as accounts that are followed by the subset of the plurality of social media accounts that are stored; the social media system is TWITTER®.

\* \* \* \* \*